(12) United States Patent
Ogasawara et al.

(10) Patent No.: US 6,690,500 B2
(45) Date of Patent: Feb. 10, 2004

(54) ABERRATION CORRECTION APPARATUS AND METHOD

(75) Inventors: Masakazu Ogasawara, Tsurugashima (JP); Masayuki Iwasaki, Tsurugashima (JP); Yoshitsugu Araki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/885,526

(22) Filed: Jun. 21, 2001

(65) Prior Publication Data

US 2002/0024688 A1 Feb. 28, 2002

(30) Foreign Application Priority Data

| Jun. 30, 2000 | (JP) | ................................. 2000-198163 |
| Nov. 9, 2000 | (JP) | ................................. 2000-342014 |
| Dec. 14, 2000 | (JP) | ................................. 2000-380242 |

(51) Int. Cl.[7] .............................. G02F 1/03; G02F 1/07
(52) U.S. Cl. .................... 359/245; 359/568; 359/252
(58) Field of Search .................... 359/16, 245, 252, 359/253, 254, 279, 349, 558, 563, 566, 569, 573, 619, 625, 637

(56) References Cited

U.S. PATENT DOCUMENTS

| 4,422,729 | A | * | 12/1983 | Suzuki et al. ............... 359/245 |
| 5,043,625 | A | * | 8/1991 | Chen ........................... 313/414 |
| 5,078,480 | A | * | 1/1992 | Warszawski ................ 359/265 |
| 5,144,471 | A | * | 9/1992 | Takanashi et al. .......... 359/245 |
| 6,320,691 | B1 | * | 11/2001 | Ouchi et al. ................ 359/237 |
| 6,370,095 | B1 | * | 4/2002 | Ogasawara .............. 369/53.19 |

FOREIGN PATENT DOCUMENTS

JP          10-269611          10/1998

* cited by examiner

Primary Examiner—Ricky Mack
Assistant Examiner—Brandi N Thomas
(74) Attorney, Agent, or Firm—Morgan, Lewis & Bockius LLP

(57) ABSTRACT

An aberration correction device for correcting aberration produced in a light beam, which includes: a first electrode layer and a second electrode layer being opposed to each other; and a liquid crystal disposed between the first electrode layer and the second electrode layer for producing a change in phase in a light beam passing therethrough in accordance with voltages applied to the first electrode layer and the second electrode layer. The first electrode layer is divided into a plurality of phase adjustment portions which are electrically isolated each other. Each of the plurality of phase adjustment portions includes a pair of electrodes arranged in such a form that produces an electric field distribution for correcting the aberration by applying predetermined voltages thereto.

20 Claims, 39 Drawing Sheets

FIG.8
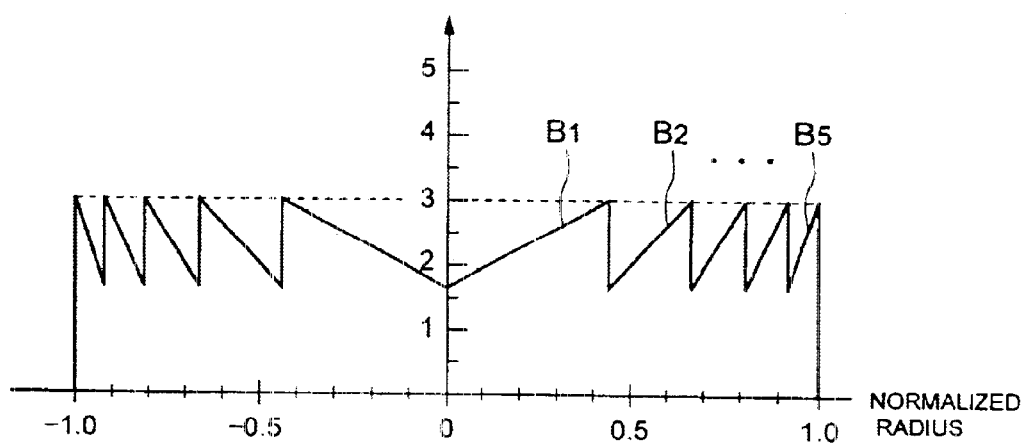
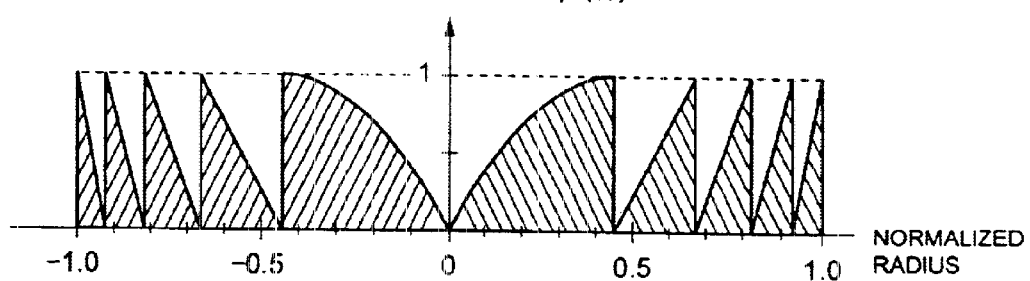

FIG.10
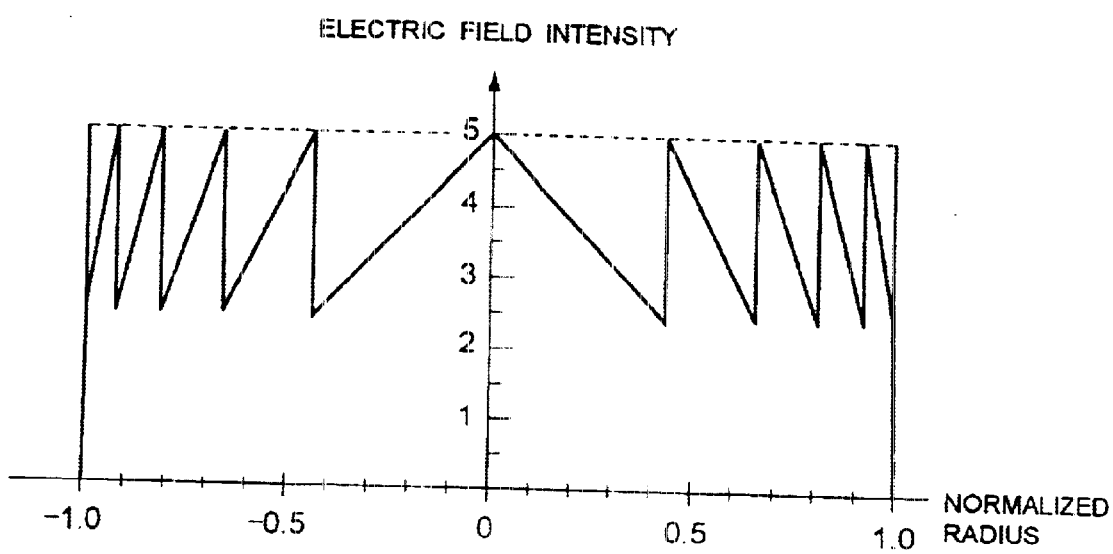
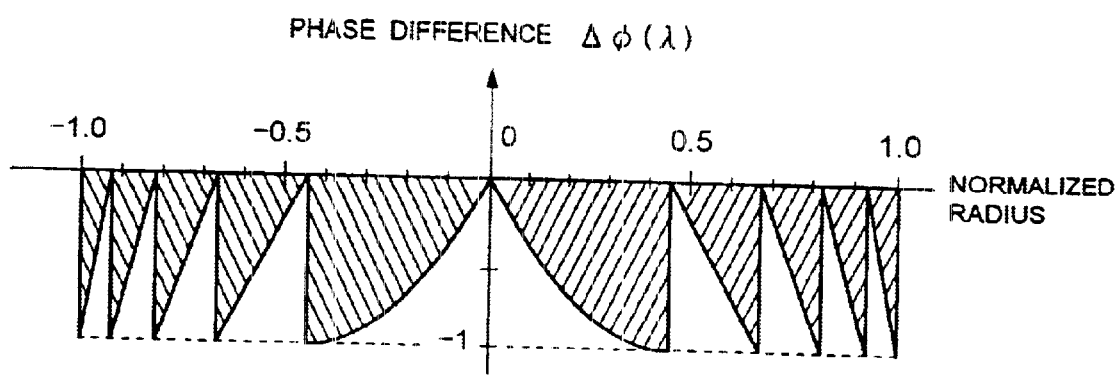

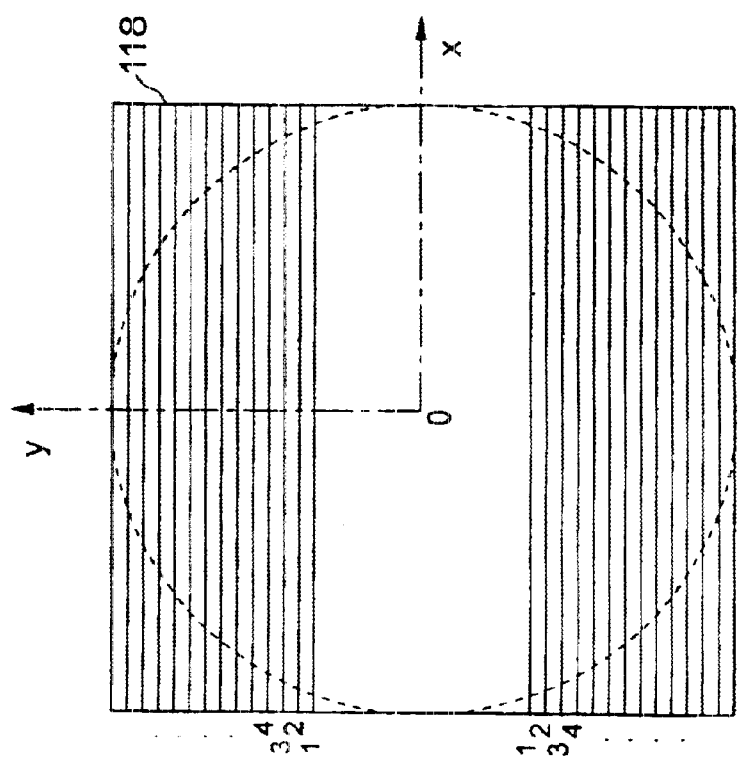
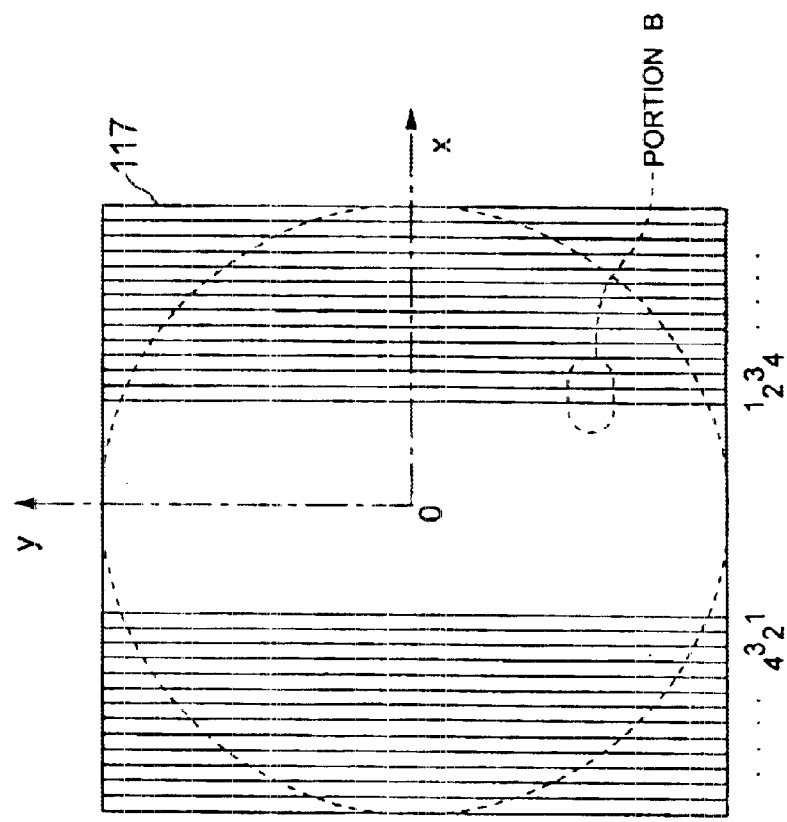

FIG.38
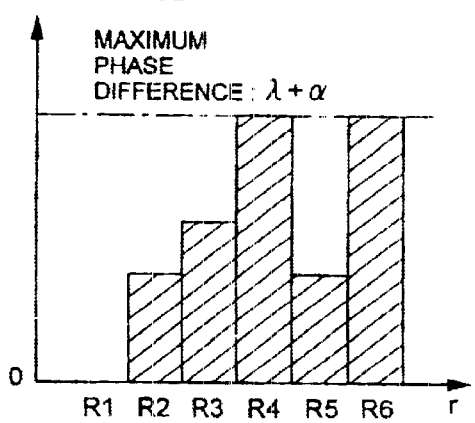
(a)
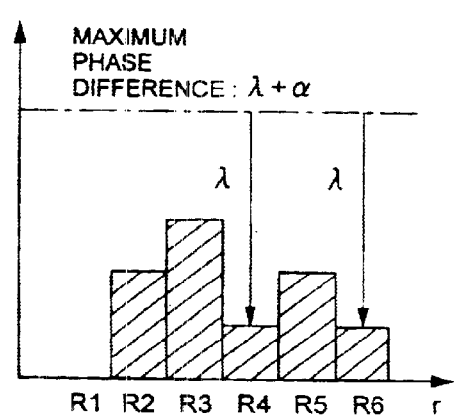
(b)

ABERRATION CORRECTION APPARATUS AND METHOD

BACKGROUND OF THE INVENTION

1. Field of the Invention

The present invention relates to an aberration correction apparatus and method for correcting aberration produced in a light beam of an optical system.

2. Description of the Related Art

Optical discs such as CD (Compact Disc) and DVD (Digital Video Disc or Digital Versatile Disc) are known as information recording media on which information is optically recorded or reproduced. In addition, various types of optical discs are now under development, such as an optical disc dedicated to reproduction, a write-once optical disc on which information can be additionally recorded, and a rewritable optical disc on which information can be erased and recorded again.

Also, research and development has advanced for optical pickup devices and information recording/reproducing apparatus which can be adapted to higher density discs, with the trend of increasing the density of optical discs. In addition, research and development has also advanced for so-called compatible optical pickup devices and information recording/reproducing apparatus which can utilize different types of optical discs.

It is contemplated that the numerical aperture (NA) of an objective lens provided in an optical pickup device is increased to irradiate an optical disc with a light beam having a smaller irradiation diameter in order to support the higher density optical discs. Also, a light beam having a shorter wavelength is used to address the higher density discs.

However, an increase in the numerical aperture NA of an objective lens or employment of a light beam having a shorter wavelength results in a larger influence of aberration on the light beam by the optical disc, thereby making it difficult to improve the accuracy of information recording and information reproduction.

For example, the amount of birefringence, which depends on the incident angle, will have a larger distribution width on the pupil plane of the optical disc since a larger numerical aperture NA of an objective lens results in a wider incident angle range of a light beam for an optical disc. This causes a problem of increased aberration influence resulting from the birefringence. Also, aberration due to an error or variance in the thickness of a cover layer for protecting a recording surface of the disc exerts a larger influence.

To reduce the influence of the aberration as mentioned, a pickup device provided with a liquid crystal device for correcting the aberration has been previously proposed. Such an aberration correction device is disclosed, for example, in Japanese Patent Application Kokai No. H10-269611. The aberration correction device has a plurality of concentrically formed phase adjustment portions, and applies each electrode with a predetermined voltage to adjust an orientation state of the liquid crystal to correct aberration produced in a light beam. However, the aberration correction device configured as described has a problem that it can correct only wavefront aberration which has a particular distribution shape. Also, for correcting large aberration which may exceed the wavelength of a light source, a thicker liquid crystal must be provided to apply a larger voltage. Further, a large number of phase adjustment portions must be provided for accommodating the wavefront aberration of various magnitudes. An increase in the number of electrodes would result in requirements for a very large number of electrodes and complicated wiring. Consequently, this would constitute a hindrance in the trend of pursuing higher performance of the aberration correction device, including a reduction in size and thickness and a higher speed. Also, the thicker liquid crystal causes a problem of degrading the frequency response of the aberration correction device.

Another aberration correction method uses a hologram element which deflects light transmitting therethrough to produce a phase difference in the light. However, the hologram element cannot be turned on/off as required. In addition, similar to the foregoing, the hologram element has a problem in that it can correct only wavefront aberration that has a particular distribution shape. The hologram element is further disadvantageous in that it is difficult and expensive to manufacture.

OBJECT AND SUMMARY OF THE INVENTION

The present invention has been made in view of the problems mentioned above, and the object of the present invention is to provide a compact and high performance aberration correction unit which is capable of correcting aberration over an entire range of an optical path diameter, with the ability of correcting large aberration as well. It is also an object of the present invention to provide an optical pickup device and an aberration correction apparatus which have the aberration correction unit.

It is another object of the present invention to provide a compact and high-performance aberration correction apparatus and a method which are capable of correcting aberration having a variety of shapes and capable of correcting large aberration as well.

To achieve the object, according to one aspect of the present invention, there is provided an aberration correction unit disposed in an optical path of an optical system for irradiating a recording medium with a light beam for correcting aberration produced in the light beam, the aberration correction unit comprises: a first electrode and a second electrode being opposed to each other; and a liquid crystal disposed between the first electrode and the second electrode for applying a voltage to produce a change in phase to light passing therethrough, wherein the first electrode and the second electrode are formed in a shape such that the liquid crystal produces an effect of holographic diffraction grating by applying voltages to the first electrode and the second electrode.

According to another aspect of the present invention, there is provided an optical pickup device having the aberration correction unit, which comprises: a light source for emitting the light beam; an optical system for guiding the light beam; and an optical detector for detecting a light beam which has been reflected by the recording medium and transmitted the aberration correction unit.

According to another aspect of the present invention, there is provided an aberration correction apparatus having the optical pickup device, which comprises: voltage applying means for applying voltages to the first electrode and the second electrode of the aberration correction unit such that the liquid crystal produces an effect of holographic diffraction grating.

According to another aspect of the present invention, there is provided an aberration correction device for correcting aberration produced in a light beam of an optical system for guiding the light beam, which comprises: a first electrode layer and a second electrode layer being opposed to each other; and a liquid crystal disposed between the first electrode layer and the second electrode layer for producing a change in phase in a light beam passing therethrough in accordance with voltages applied to the first electrode layer and the second electrode layer, wherein the first electrode layer is divided into a plurality of phase adjustment portions which are electrically isolated each other, each of the plurality of phase adjustment portions including a pair of electrodes arranged in such a form that produces an electric field distribution for correcting the aberration by applying predetermined voltages thereto.

According to another aspect of the present invention, there is provided an aberration correction apparatus having the aberration correction device, which comprises: a determination section for determining each aberration amount of the light beam in a region corresponding to each of the plurality of phase adjustment portions; a voltage applying section for applying each of the plurality of phase adjustment portions with voltages corresponding to each of the determined aberration amounts; a selecting section for selecting a phase adjustment region including one or more consecutive phase adjustment portions based on each of the determined aberration amounts; and a controller for conducting a control for changing a phase-adjustment amount in the phase adjustment region to a phase amount corresponding to an integer multiple of the wavelength of the light beam.

According to another aspect of the present invention, there is provided an aberration correction apparatus for correcting aberration produced in a light beam of an optical system for guiding the light beam, which comprises: an aberration correction device having a plurality of phase adjustment portions for producing a phase change in the light beam by an voltage applied thereto; a phase adjustment section for applying voltage to each of the plurality of phase adjustment portions to adjust the phase; a determination section for determining whether a phase-adjustment amount of each the phase adjustment portion exceeds a predetermined limit adjustment amount; and a controller for changing the phase-adjustment amount of each the phase adjustment portion to a value resulting from a subtraction of a phase amount corresponding to an integer multiple of the wavelength of the light beam from the phase-adjustment amount on the basis of the result of determination made by the determination section.

According to another aspect of the present invention, there is provided a method of correcting aberration for an aberration correction device having a plurality of phase adjustment portions for producing a phase change in a light passing through the aberration correction device to adjust the phase, which comprises the steps of: applying a voltage to each of the plurality of phase adjustment portions to adjust the phase; determining whether a phase-adjustment amount of the phase adjustment portion exceeds a limit adjustment amount; and changing the phase-adjustment amount of each the phase adjustment portion to a value resulting from a subtraction of a phase amount corresponding to an integer multiple of the wavelength of the light beam from the phase-adjustment amount on the basis of the result of the determination in the determining step.

BRIEF DESCRIPTION OF THE DRAWINGS

FIG. 8 is a diagram schematically illustrating electric field blades Bi produced in the liquid crystal of the aberration correction unit, and a phase difference $\Delta\phi$ produced in transmitted light by each blade;

FIG. 10 is a diagram schematically illustrating electric field blades Bi produced in the liquid crystal of the aberration correction unit, and a phase difference $\Delta\phi$ produced in transmitted light by each blade;

FIGS. 21A, 21B are plan views schematically illustrating the structure of first and second electrode layers, respectively, in an aberration correction device according to a fifth embodiment of the present invention;

FIG. 38 is a diagram showing an aberration correction operation when the phase-adjustment amount is increased for correcting large aberration.

DETAILED DESCRIPTION OF THE EMBODIMENTS

Figure 1:
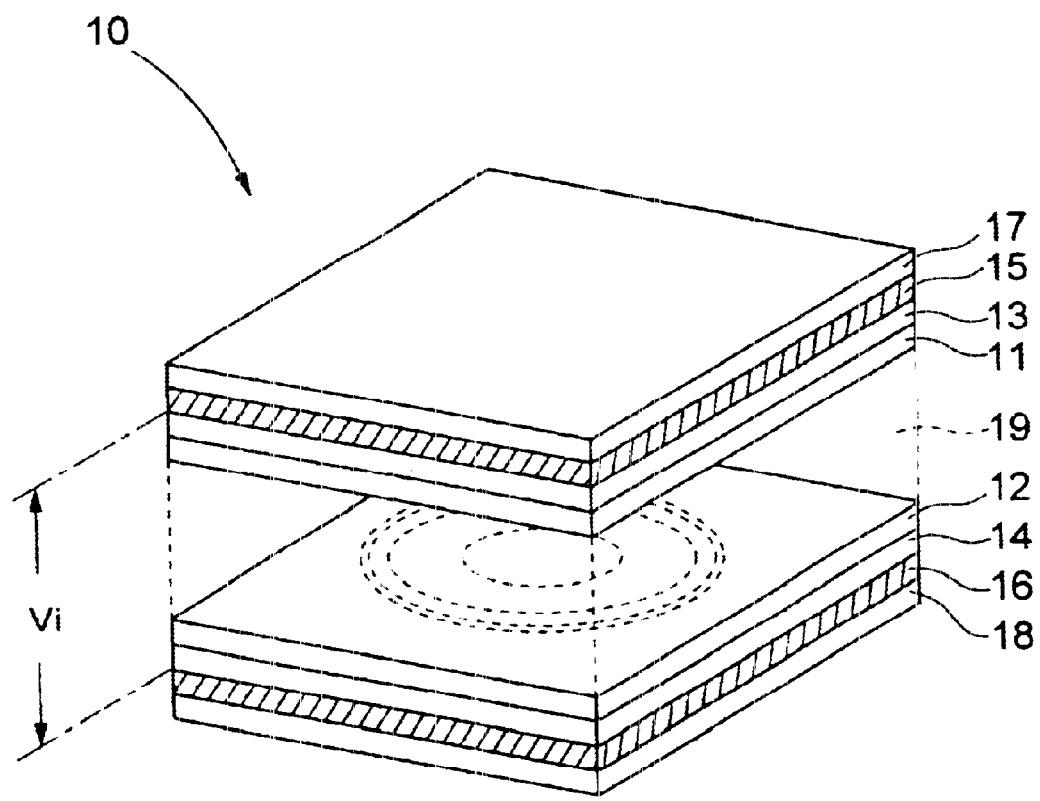
FIG. 1 is a perspective view schematically illustrating the configuration of an aberration correction unit according to a first embodiment of the present invention.

Embodiments of the present invention will be described in detail with reference to the drawings. In the drawings used in the following description, substantially equivalent components are designated the same reference numerals.

First Embodiment

FIG. 1 is a perspective view schematically illustrating the configuration of an aberration correction unit or device 10 according to a first embodiment of the present invention. The aberration correction unit 10 is incorporated, for example, in an optical pickup of an optical recording and/or reproducing apparatus (hereinafter, simply referred to as an optical recording/reproducing apparatus) which uses an optical disc or the like as a recording medium, and is used for correcting aberration produced in a light beam.

The aberration correction optical unit (hereinafter simply referred to as the "aberration correction unit") 10 has a liquid crystal optical device (hereinafter simply referred to as the "liquid crystal") which produces a change in birefringence to light passing therethrough by an electric field produced in accordance with the magnitude of a driving voltage (V) applied thereto. More specifically, the aberration correction unit 10 has liquid crystal orienting films 11, 12, insulating layers 13, 14, electrode layers 15, 16, and two insulating layers 17, 18 made of transparent glass substrates or the like, formed on both sides of the liquid crystal 19.

As the driving voltage V is applied between the electrode layers 15, 16, the orientation of liquid crystal molecules in the liquid crystal 19 changes in response to an electric field E generated by the driving voltage V. As a result, light passing through the liquid crystal 19 receives the birefringence of the liquid crystal 19 to present a change in phase. In other words, the phase of the light passing through the liquid crystal can be controlled by the driving voltage V applied to the liquid crystal 19. It is therefore possible to correct aberration by forming the electrode layers 15, 16 in a shape suited to a distribution of the aberration and applying the electrode layers 15, 16 with a voltage in accordance with the magnitude of the aberration. Also, the aberration correction unit 10 has bi-directional optical transmittance, so that either of the insulating layers 17, 18 can be oriented to a recording medium such as an optical disc.

Figure 2:
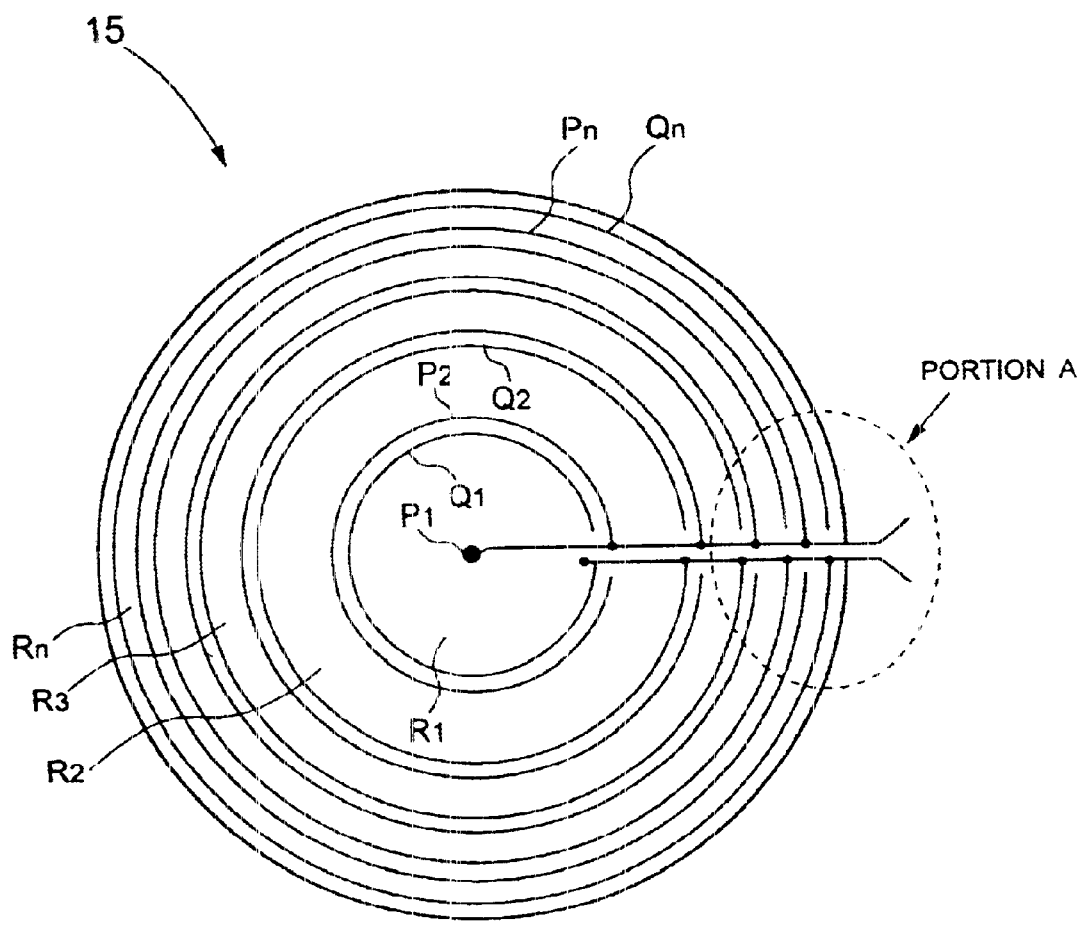
FIG. 2 is a top plan view schematically illustrating electrodes formed in one electrode layer, and the shapes of regions divided by the electrodes in the aberration correction unit illustrated in FIG. 1.
Figure 3:
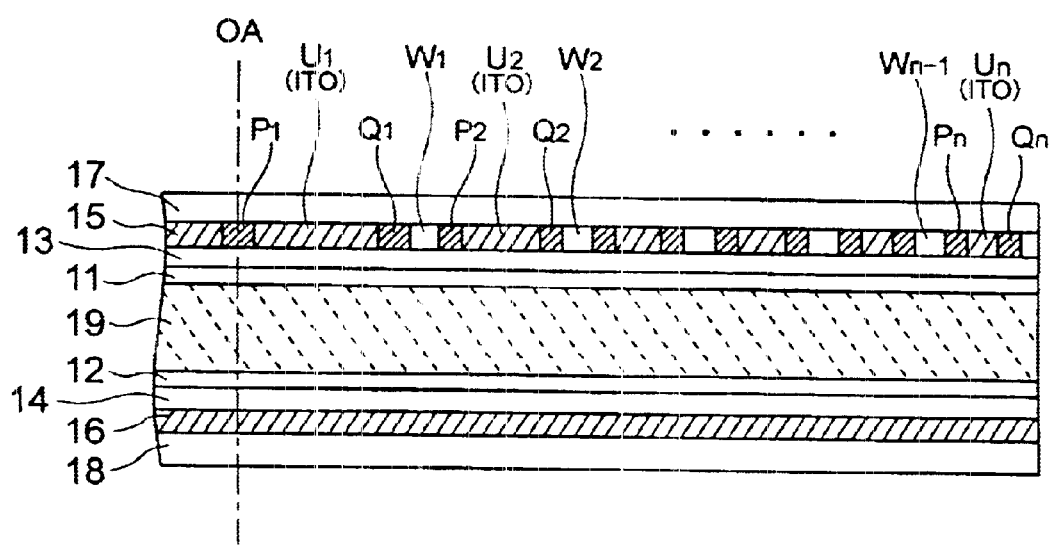
FIG. 3 is a cross-sectional view in a radial direction of the aberration correction unit illustrated in FIG. 1.

In the following, the structure of electrodes in the aberration correction unit 10 will be described in detail with reference to the drawings. FIG. 2 is a top plan view schematically illustrating electrodes formed in one electrode layer 15 of the aberration correction unit 10, and the shapes of regions divided by the electrodes. FIG. 3 is a cross-sectional view of the aberration correction unit 10 taken in a radial direction. The electrode layer 15 is formed with n (n is a natural number) sets of concentric electrodes Pi and Qi (i=1, 2, ..., n) made of metal, and regions Ri bordered by the electrodes Pi and Qi. More specifically, referring further to a partially enlarged view of a portion A illustrated in FIG. 4, the region Ri is comprised of the electrodes Pi and Qi, and a transparent conductive film Ui (i=1, 2, ..., n) made of ITO (indium tin oxide) formed between the electrodes Pi and Qi. The respective regions Ri are separated by gaps Wi. The ITO film Ui is electrically connected to the electrodes Pi and Qi, and the gap Wi has a width sufficiently smaller than the width of the region Ri, for example, on the order of several micrometers ($\mu$m).

Figure 4:
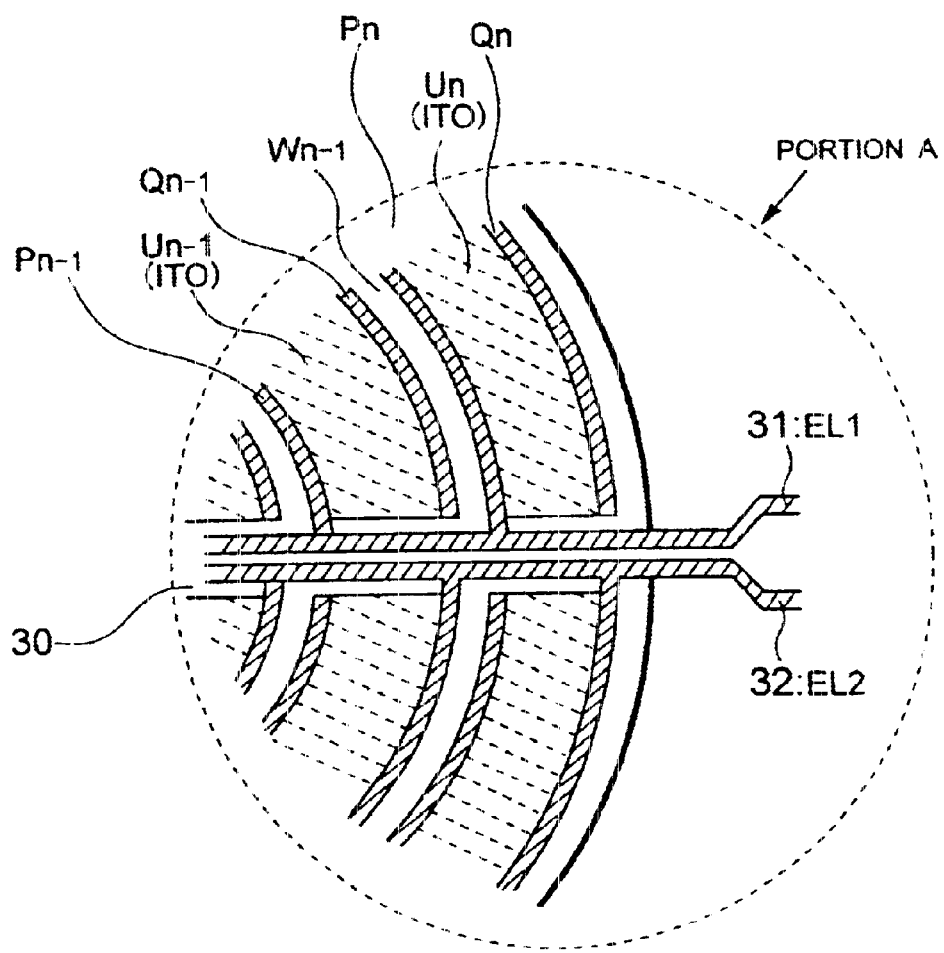
FIG. 4 is a partially enlarged view of a portion A in the one electrode layer of the aberration correction unit illustrated in FIG. 2.

Further, as illustrated in FIGS. 2 and 4, within a slit 30 formed along a radial direction, lead or wiring electrodes 31 (EL1) and 32 (EL2) electrically isolated from each other are formed, and the electrodes Pi (i=1, 2, ..., n) is electrically connected to the lead electrode 31 (EL1); and the electrodes Qi (i=1, 2, ..., n)to the lead electrode 32 (EL2), respectively. The slit 30 is formed, for example, to have a width of several $\mu$m so as not to adversely affect the aberration correction and to be sufficiently small as compared with an effective optical path area of the aberration correction unit 10.

As illustrated in FIG. 3, another electrode layer 16 has a structure in which an entire surface electrode made of a transparent conductive material (ITO) is formed thereon.

Figure 5:
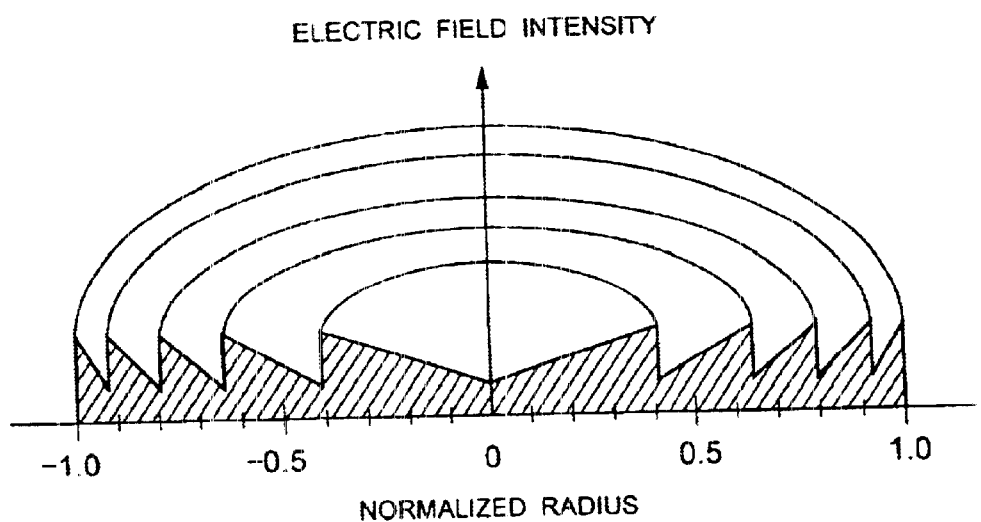
FIG. 5 is a diagram three-dimensionally and schematically illustrating a distribution of an electric field produced within a liquid crystal when voltages are applied to lead electrodes (EL1), (EL2) of the one electrode layer and an entire surface electrode of the other electrode layer.

According to the present invention, the liquid crystal 19 operates as a holographic diffraction grating by applying voltages to the electrode layer 15 and the electrode layer 16. FIG. 5 is a diagram which three-dimensionally and schematically illustrates a distribution of an electric field produced in the liquid crystal 19 when voltages are applied to the lead electrodes 31 (EL1), 32(EL2) of the electrode layer 15 and the entire surface electrode of the electrode layer 16. Hatched portions indicate electric field intensities on the cross section, which pass the center of the field distribution, with respect to the normalized effective optical path radius.

As illustrated, the electrodes are formed such that an electric field in the shape of concentric blades, i.e., an electric field having a field distribution cross section in a sawtooth shape is produced in the liquid crystal 19 when voltages are applied. A phase difference produced in transmitting light is determined by the difference between a peak and a valley of the sawtooth-shaped electric field (in the following description, respective concentric peaks are referred to the "field blades" or simply "blades" for convenience of description). Therefore, the aberration correction unit 10 has an effect equivalent to a holographic diffraction grating for transmitting light by means of the blade-shaped electric field produced by the applied voltages.

While the field distribution is determined by the shapes of the electrodes and voltages applied thereto, the field distribution can be readily calculated by solving an electromagnetic field equation by a well known method, for example, using a computer. In the following, the operation of the aberration correction unit 10 will be described in detail.

Figure 6:
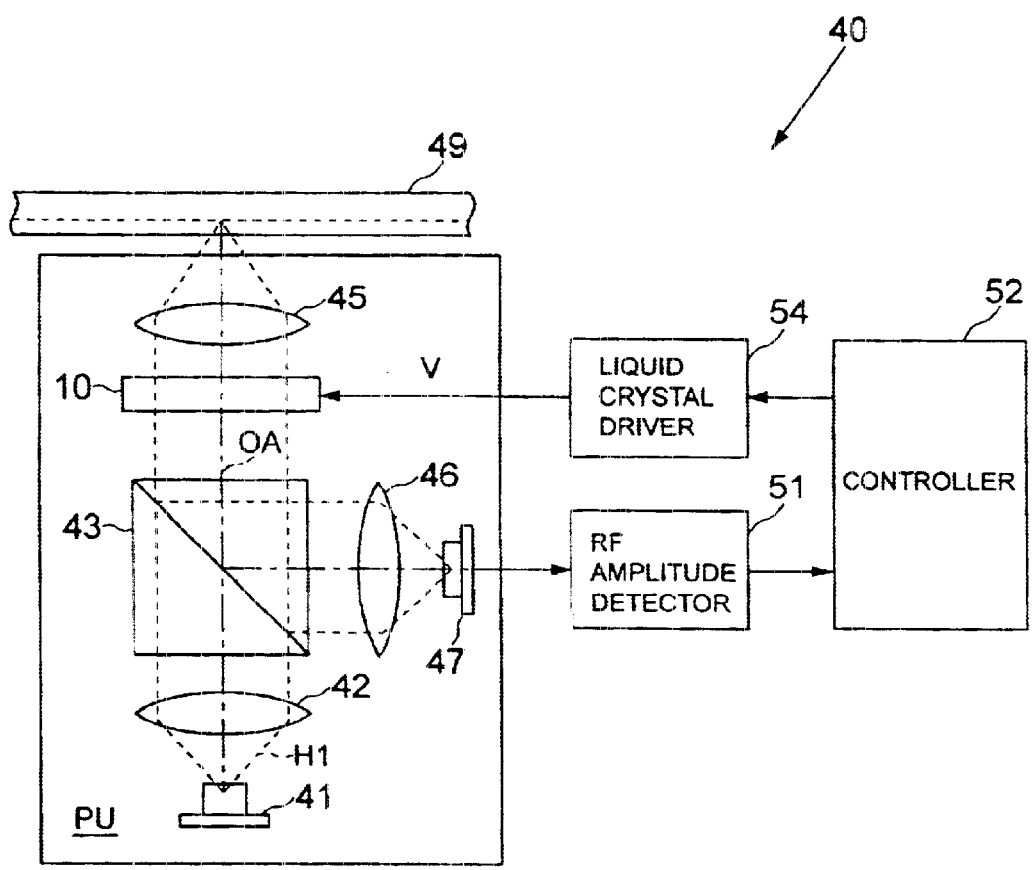
FIG. 6 is a diagram illustrating the configuration of an optical pickup device and an aberration correction apparatus which have the aberration correction unit according to the present invention.

FIG. 6 is a diagram illustrating the configuration of an optical pickup having the aberration correction unit 10, and an aberration correction apparatus 40. The optical pickup PU comprises a light source 41 for emitting laser light H1; a beam splitter 43; the aberration correction unit 10; an objective lens 45; a focusing lens 46; and an optical detector 47. These optical components 41–47 are positioned along an optical axis OA.

The laser light source 41 in the optical pickup emits laser light at wavelength $\lambda$ of, for example, 405 nanometer (nm). The light beam H1 emitted from the laser light source 41 is reflected off an optical disc 49, and the reflected light is detected by the optical detector 47. The detected RF signal is sent to an RF amplitude magnitude detector 51 (hereinafter simply referred to the "RF amplitude detector"). The RF amplitude detector 51 detects an envelope of the received RF signal which is sent to a controller 52 as an RF amplitude signal. The controller 52 supplies a control signal to a liquid crystal driver 54 for driving the aberration correction unit 10 based on the received RF amplitude signal or in accordance with a predetermined processing procedure. The liquid crystal driver 54 generates a driving voltage to be applied to the aberration correction unit 10 in response to the control signal, and supplies the driving voltage to the aberration correction unit 10.

Figure 7:
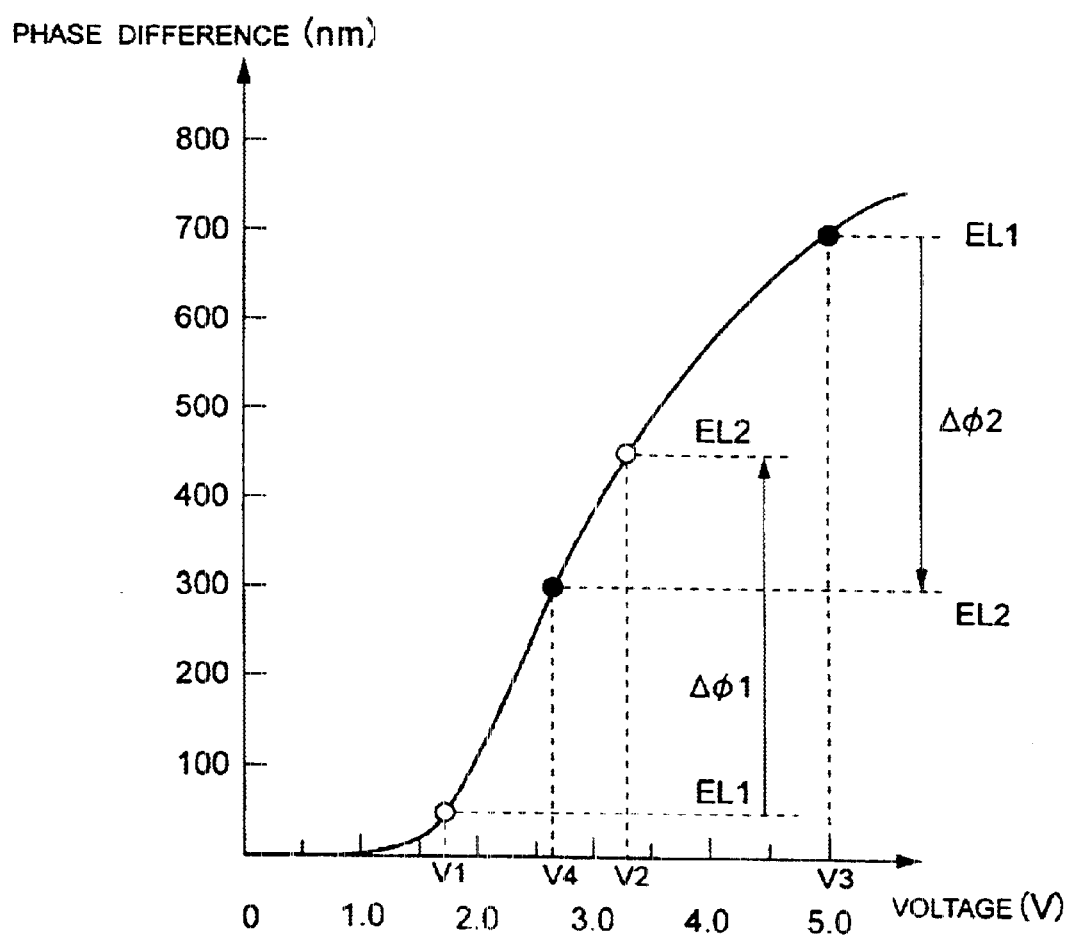
FIG. 7 is a graph showing the phase difference characteristic of a liquid crystal of the aberration correction unit with respect to an applied voltage.
Figure 9:
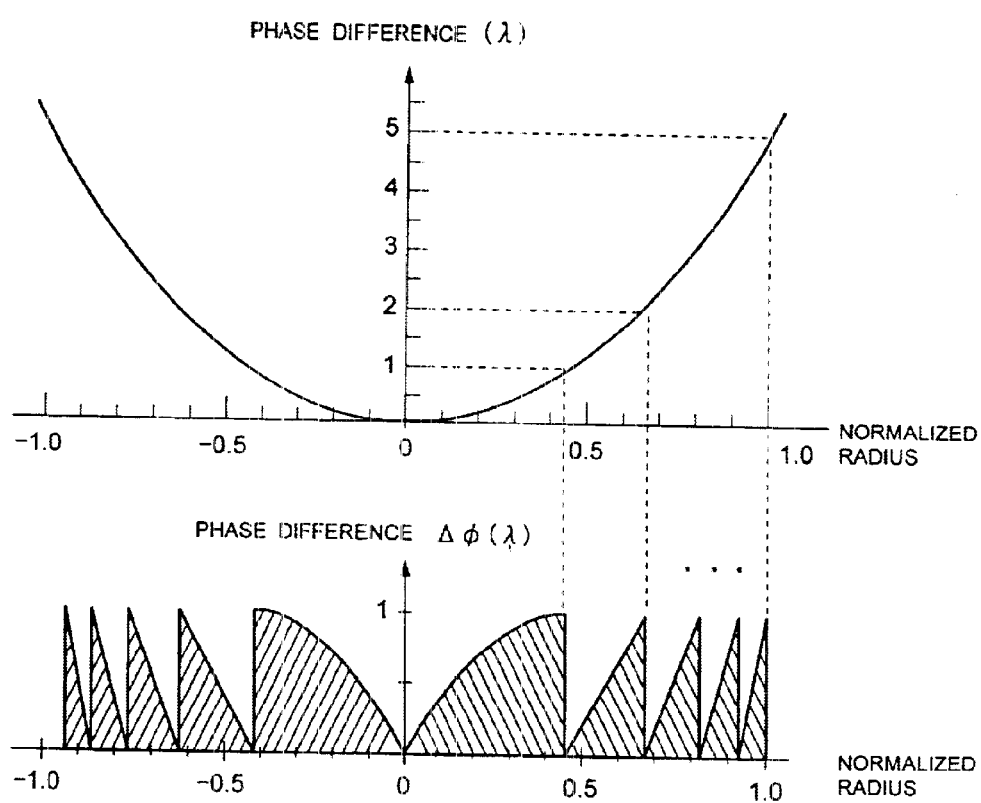
FIG. 9 is a diagram illustrating a correction for a phase difference $\phi$ provided to transmitted light within an entire effective optical path diameter by the phase difference $\Delta\phi$ produced in transmitted light by each electric-field blade.

FIG. 7 is a graph showing the phase difference characteristic of the aberration correction unit 10 with respect to applied voltages. When the lead electrode 31 (EL1) of the electrode layer 15 is applied with a voltage V1 (=1.7 V); the lead electrode 32 (EL2) with a voltage V2 (=3.0 V); and the entire surface electrode of the electrode layer 16 with 0 V (or grounded) in an operation mode 1, a phase difference $\Delta\phi1$ produced by each blade in the liquid crystal 19 is 405 nm (=$\lambda$) which is equal to the wavelength of the laser light. Therefore, in the aberration correction unit 10 having five regions Ri(i=1, 2, ..., 5), five field blades Bi (i=1, 2, ..., 5) are produced as illustrated in FIG. 8. A phase difference produced in transmitting light by each blade accumulatively increases from the center of the optical path to the outer periphery, as illustrated in FIG. 9, wherein a phase difference $\phi1$ given to the transmitting light is $5\lambda$ (=$5\times\Delta\phi1$) in the full effective light path. It is therefore possible to correct spherical aberration of $5\lambda$ by the aberration correction unit 10.

Contrary to the foregoing, spherical aberration produced by reflection on the optical disc may increase from the center of the optical path to the outer periphery depending on the thickness of a transparent layer such as a cover layer from the surface of the optical disc to the recording layer, which is transmitted by irradiated light or reflected light. In this case, a phase difference reverse to the foregoing case, i.e., a negative phase difference is produced on the outer periphery with respect to the center of the optical path. As illustrated in FIG. 7, when the lead electrode 31 (EL1) of the electrode layer 15 is applied with a voltage V3 (=5.0 V); the lead electrode 32 (EL2) with a voltage V4 (=2.6 V); and the entire surface electrode of the electrode layer 16 with 0 V (or grounded) in an operation mode 2, a phase difference $\Delta\phi2$ produced by each blade in the liquid crystal 19 is –405 nm (=–$\lambda$). Therefore, as illustrated in FIG. 10, a negative phase difference is accumulatively given to the phase difference produced in the transmitting light toward the outer periphery, and the phase difference $\alpha\phi2$ given to the transmitting light is $\phi2$=–$5\lambda$ (=$5\times\Delta\phi2$) in the entire effective optical path diameter. It is therefore possible to correct spherical aberration having a magnitude of $5\lambda$ which decreases from the center of the optical path to the outer periphery.

It should be noted that all the electrodes Pi (i=1, 2, ..., n) need not be electrically connected to the lead electrode 31 (EL1) nor all the electrodes Qi (i=1, 2, ..., n) to the lead electrode 32 (EL2). For example, the electrodes Pi and Qi may be divided into several sets, each of which is provided with a lead electrode so that the phase can be controlled for each set. In other words, in the blade in each region Ri, the respective electrodes may be connected to produce phase differences which are integer multiples of the wavelength.

Second Embodiment

Figure 11:
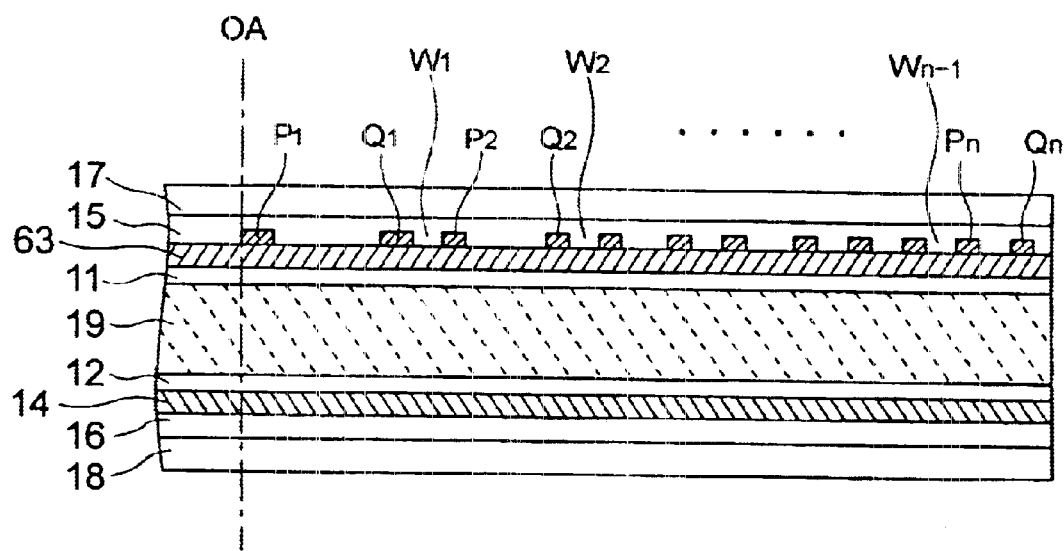
FIG. 11 is a cross-sectional view of an aberration correction unit according to a second embodiment of the present invention in a radial direction.
Figure 12:
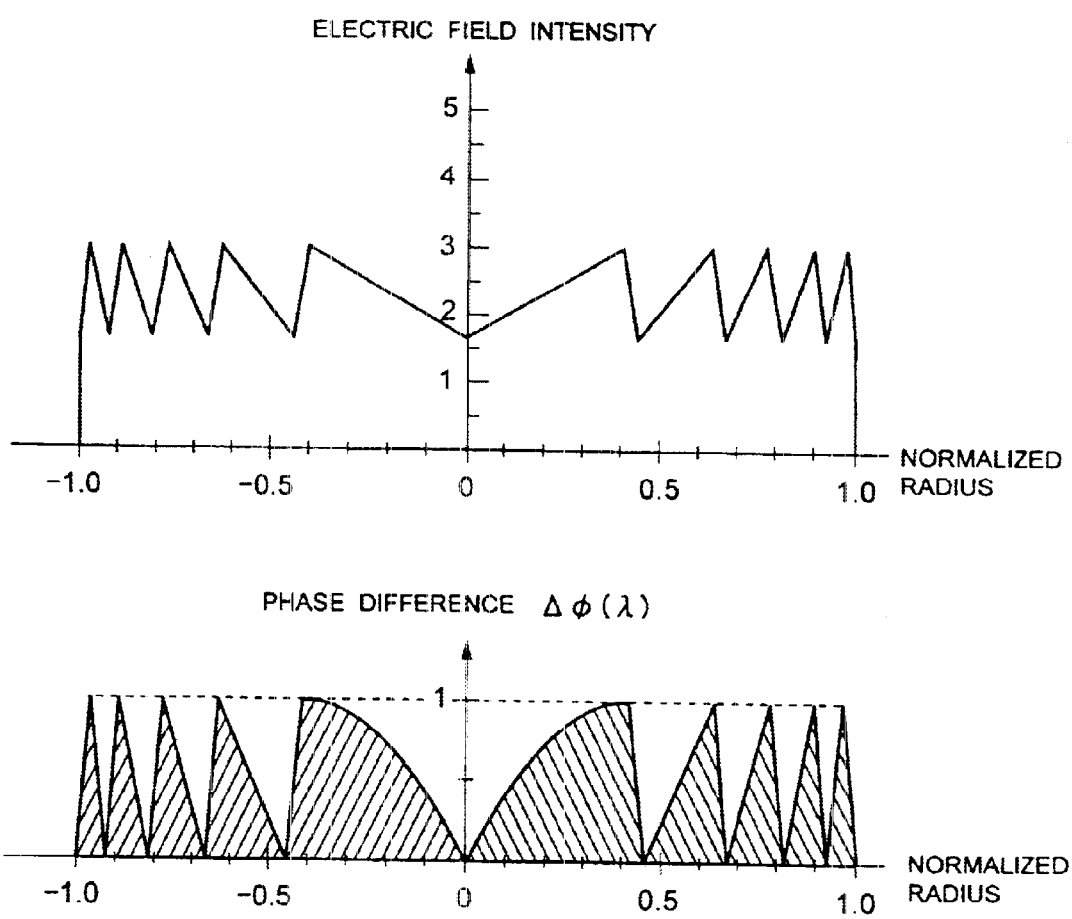
FIG. 12 is a diagram schematically illustrating an electric field produced in a liquid crystal of the aberration correction unit according to the second embodiment of the present invention, and a phase difference produced in transmitted light.

FIG. 11 is a cross-sectional view of an aberration correction unit according to a second embodiment of the present invention. In the foregoing first embodiment, the ITO films are formed between the electrodes Pi and Qi so that the respective regions Ri are electrically isolated from each other. In the second embodiment, an ITO film 63 is formed over the entire surface of a liquid crystal orienting film 11, and circular or annular-ring shaped electrodes Pi and Qi are concentrically formed on the ITO film 63 as is the case with the foregoing first embodiment In this event, as illustrated in FIG. 12, the respective regions Ri are also connected by the ITO film, so that a gradient electric field is produced as well in portions between the respective regions Ri of the blade-shaped electric field produced in the liquid crystal 19. In the second embodiment, similar to the first embodiment, spherical aberration can be corrected by applying voltages to the respective electrodes such that the phase difference $\Delta\phi$ produced by each blade in the liquid crystal 19 is an integer multiple of the wavelength of the light source.

Third Embodiment

Other than the embodiments described above, a variety of electrode shapes can be applied such that the liquid crystal produces the effect of the holographic diffraction grating.

Figure 13:
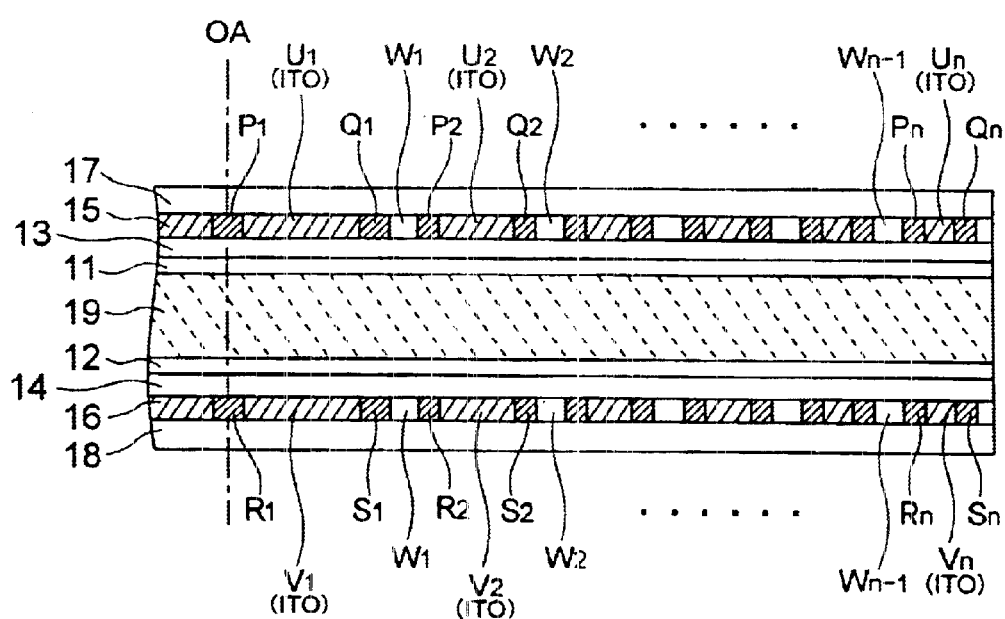
FIG. 13 is a cross-sectional view illustrating the shapes of electrodes in an aberration correction unit according to a third embodiment of the present invention.

For example, as illustrated in FIG. 13, the electrode layer 16 may have a structure similar to that of the electrode layer 15, wherein the electrode layer 16 is formed with n sets of electrodes Ri and Si (i=1, 2, ..., n) concentrically formed in correspondence to the electrode layer 15 and associated lead electrodes. In this case, a voltage to each lead electrode may be individually adjusted. Alternatively, all the electrodes Ri and Si need not be electrically isolated. For example, all the electrodes RI and Si may be connected to a fixed voltage (for example, a ground voltage).

Figure 14:
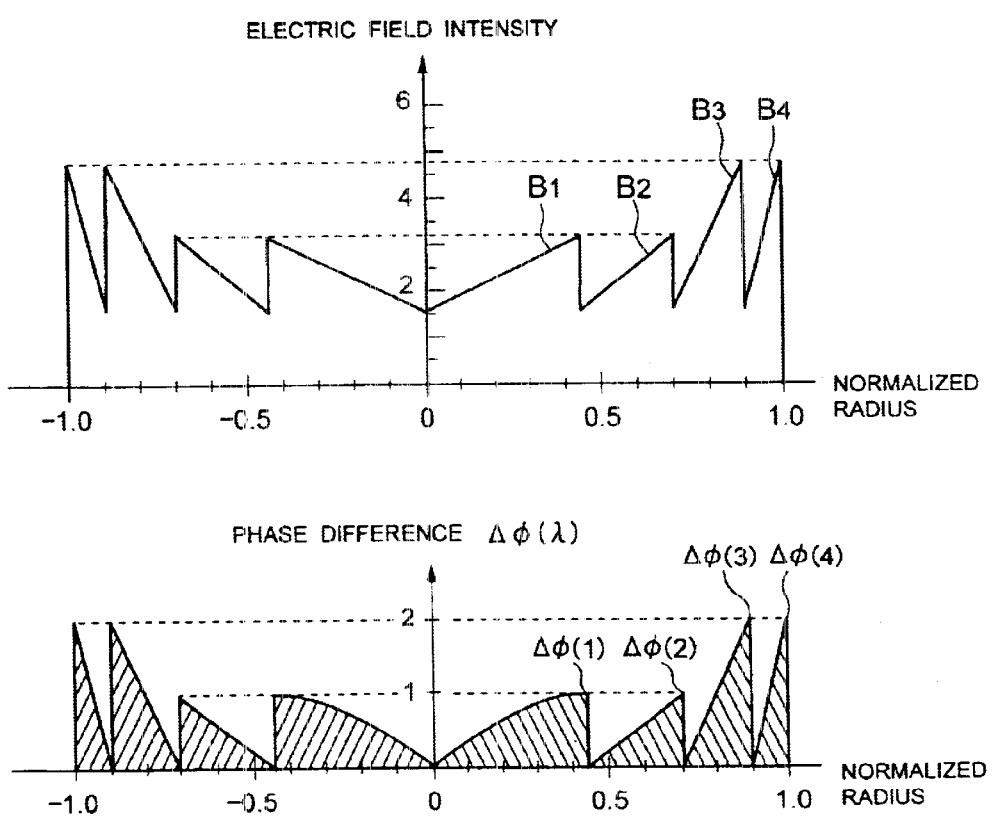
FIG. 14 is a diagram illustrating an electric field intensity of a blade-shaped electric field and a phase difference of an aberration correction unit according to the third embodiment of the present invention.

FIG. 14 illustrates an electric field intensity of a blade-shaped electric field, and a phase difference in the embodiment. In the embodiment, phase differences $\Delta\phi(i)$ (i=1–4) produced by respective field blade (B1–B4) in the liquid crystal 19 are different from one another.

More specifically, a liquid crystal which can produce a larger phase difference than the liquid crystal having the phase difference characteristic illustrated in FIG. 7, for example, a liquid crystal which exhibits a larger change in phase to a voltage or a liquid crystal having a larger thickness are used, and the shapes of electrodes and voltages applied thereto are determined such that a phase difference equal to one wavelength (i.e., $\Delta\phi(1)=\Delta\phi(2)=\lambda$) is produced by a field blade in a central region of an optical path, and a phase difference equal to two wavelengths (i.e., $\Delta\phi(3)=\Delta\phi(4)=2\lambda$) is produced by a field blade in a region closer to the outer periphery, in accordance with the shape of a spherical aberration. With such a configuration as described, a larger spherical aberration can be corrected while reducing the number of divided electrodes.

The foregoing embodiments, and numerical values and so on shown in the embodiments are merely illustrative, and they may be modified as appropriate or applied in combination.

As is apparent from the foregoing, the present invention can realize a compact and high performance aberration correction unit having the ability of correcting large aberration.

Fourth Embodiment

Figure 15:
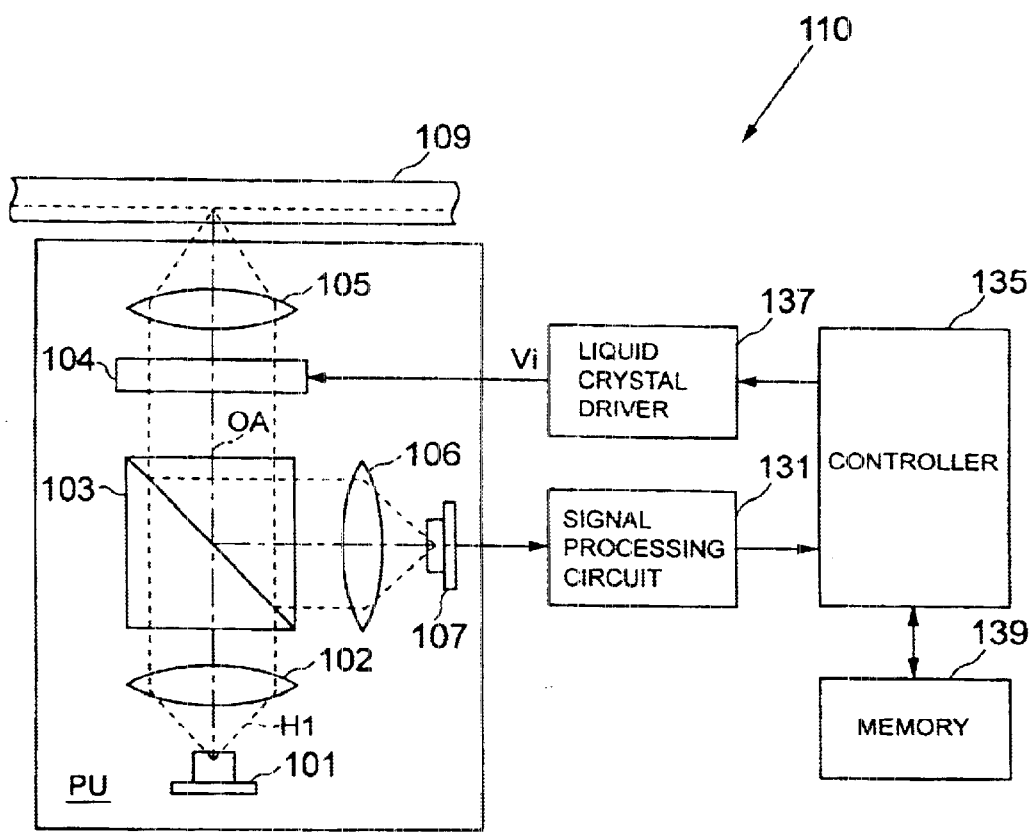
FIG. 15 is a block diagram illustrating the configuration of an aberration correction apparatus according to a fourth embodiment of the present invention.

FIG. 15 is a block diagram illustrating the configuration of an aberration correction apparatus 110 according to a fourth embodiment of the present invention. An optical pickup PU comprises a light source 101 for emitting laser light H1; a collimating lens 102; a beam splitter 103; an aberration correction device 104; an objective lens 105; a focusing lens 106; and an optical detector 107. The optical components 101–107 are located along an optical axis OA.

The laser light source 101 in the optical pickup emits laser light, for example, at wavelength $\lambda$ equal to 405 nanometer (nm). The light beam H1 emitted from the laser light source 101 is reflected off an optical disc 109, and reflected light is detected by the optical detector 107. The detected RF signal is sent to a signal processing circuit 131. The signal processing circuit 131 generates a signal required for controlling the aberration correction device 104 from the received RF signal, and sends the signal to a controller 135. For example, the signal processing circuit 131 detects the envelope of the RF signal which is sent to the controller 135 as an RF amplitude signal. The controller 135 determines the amount of aberration of a light beam in a plane of the aberration correction device, i.e., an aberration distribution (profile) based on the RF amplitude signal received from the signal processing circuit 131 and/or in accordance with a predetermined processing procedure. Further, the controller 135 determines a driving amount for each phase adjustment portions of the aberration correction device, later described, based on the aberration distribution. The controller 135 supplies a control signal indicating the driving amount to a liquid crystal driver 137 for driving the aberration correction device 104. The liquid crystal driver 137 generates a driving voltage to be applied to the aberration correction device 104 in response to the control signal, and supplies the driving voltage to the aberration correction device 104. Also, the controller 135 is connected to a storage device (memory) 139 for storing data, commands and so on for use in a variety of controls.

The aberration correction device 104 has an optoelectric element which produces an opto-electric effect by an electric field. More specifically, the aberration correction device 104 has a liquid crystal optical device which produces a change in birefringence in accordance with the magnitude of a driving voltage Vi applied thereto. More specifically, as schematically illustrated in a perspective view of FIG. 16, the aberration correction device 104 has a structure in which a liquid crystal 119 is sandwiched and encapsulated between a first electrode layer 117 and a second electrode layer 118. On the liquid crystal 119, liquid crystal orienting films 121, 122 are formed, while transparent insulating layers 123, 124 are formed between the liquid crystal orienting films 121, 122 and the first and second electrode layers 117, 118, respectively. Also, on the first and second electrode layers 117, 118, insulating substrates 115, 116 such as transparent glass substrates are formed, respectively.

Figure 16:
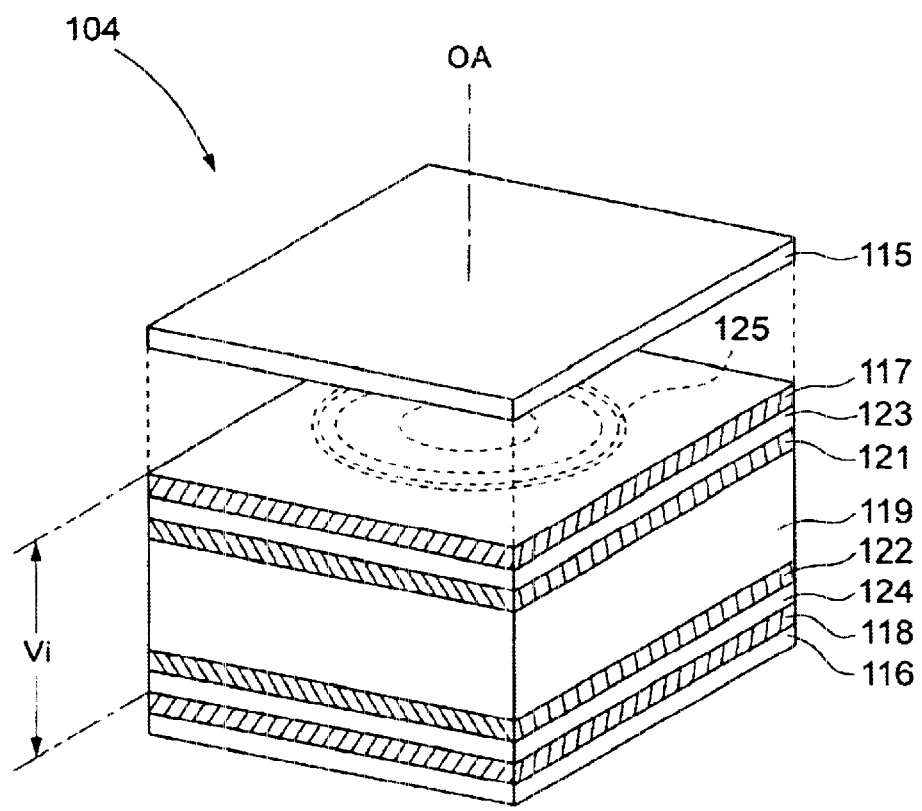
FIG. 16 is a perspective view schematically illustrating the configuration of an aberration correction device.

As will be described later in detail, at least one of the first and second electrode layers 117, 118 has a plurality of phase adjustment portions. Aberration of a light beam can be corrected by applying an electrode formed in each phase adjustment portion with a voltage according to the shape of a distribution of the aberration of the light beam which transmits the aberration correction device 104. The following description will be made on an example in which the first electrode layer 117 has a plurality of phase adjustment portions. Also, FIG. 16 illustrates an example in which a plurality of concentric phase adjustment portions 125 are formed. Specifically, as a control voltage Vi (i=1, 2, ... ) is applied to an electrode in each phase adjustment portion of the first electrode layer 117, the orientation of liquid crystal molecules in the liquid crystal 119 changes in accordance with an electric field produced by the control voltage Vi. As a result, light passing through the liquid crystal 119 undergoes birefringence of the liquid crystal 119, so that its phase changes. In other words, the polarization state (phase) can be controlled by the control voltage Vi applied to the liquid crystal 119.

Figure 17:
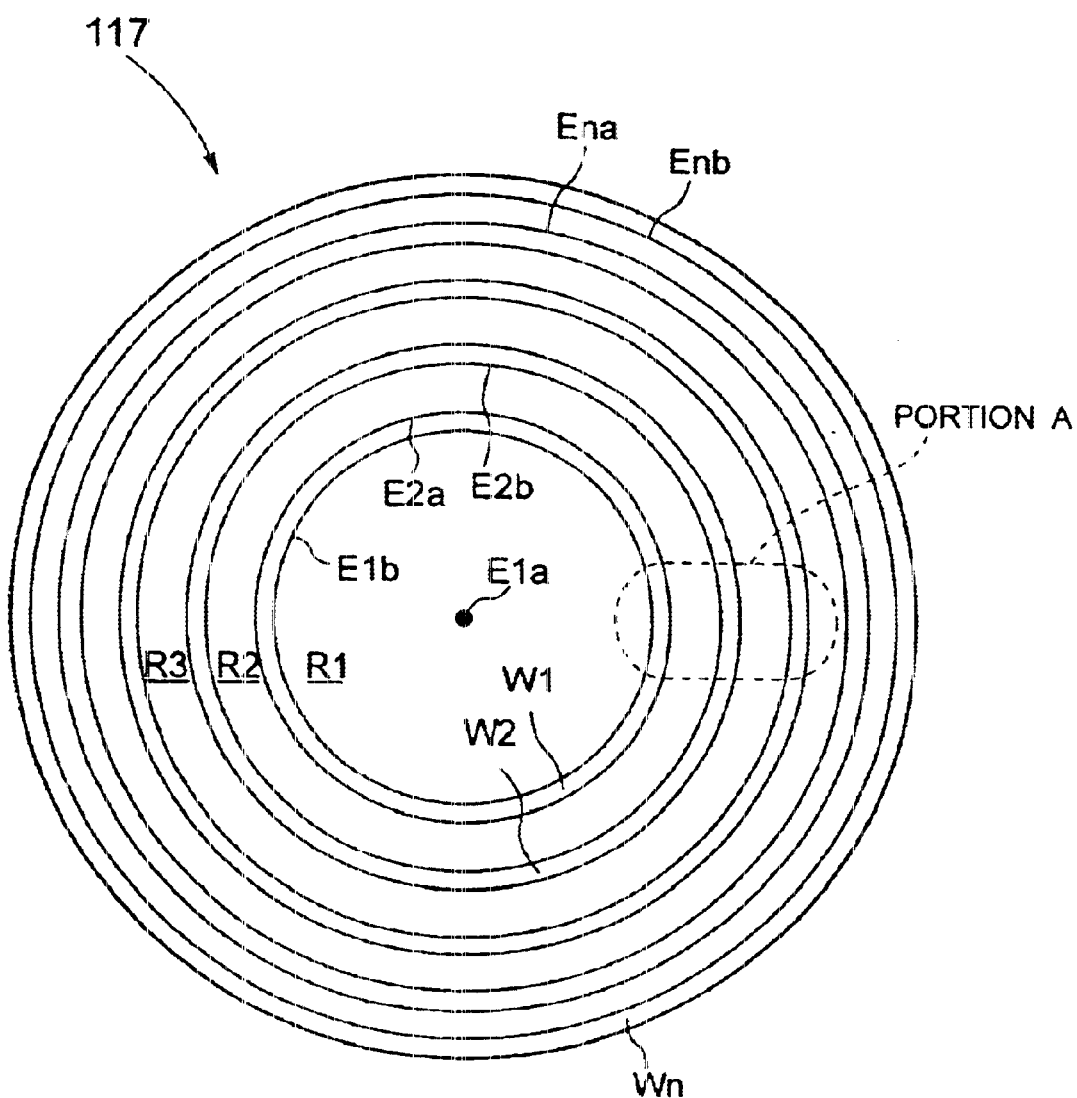
FIG. 17 is a plan view schematically illustrating the structure of a first electrode layer of the aberration correction device for correcting spherical aberration.
Figure 18:
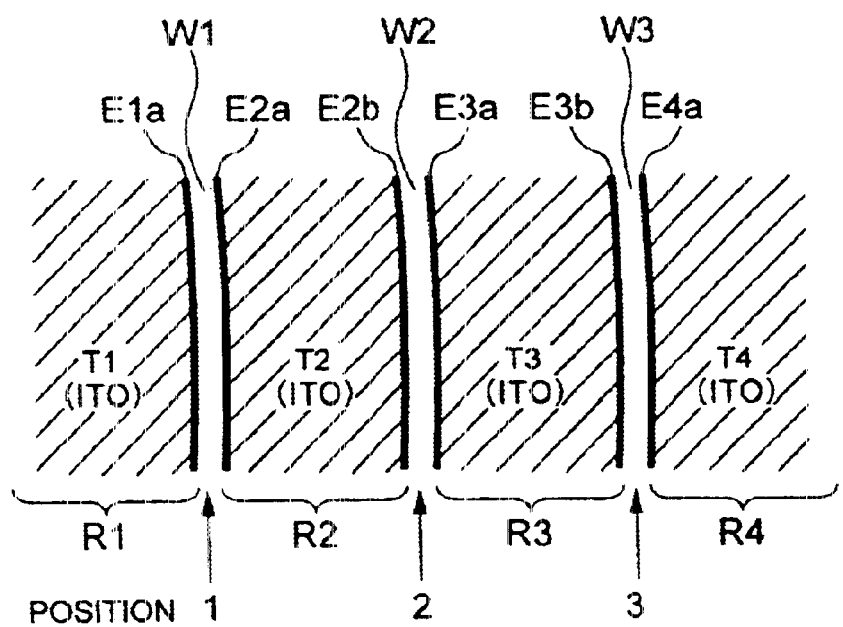
FIG. 18 is a partially enlarged view schematically illustrating a portion (a portion A) of a first electrode layer of the aberration correction device illustrated in FIG. 17.

The structure of the first electrode layer in the aberration correction device 104 for correcting spherical aberration is schematically illustrated in a plan view of FIG. 17. The first electrode layer 117 comprises a plurality of concentric (circular) phase adjustment portions Rk (k=1, 2, ...) defined by gaps Wk (k=1, 2, ...) in correspondence to a distribution of spherical aberration produced by the optical disc 109. FIG. 18 is a partially enlarged view schematically illustrating a portion (a portion A) of the first electrode layer 117.

As illustrated in FIG. 18, the phase adjustment portions Rk have a pair of circular metal electrodes Eka and Ekb (k=1, 2, ...) arranged along edges on the center side and outer side of the aberration correction device 104. The widths of the metal electrodes Eka and Ekb are sufficiently small as compared with the widths of the phase adjustment portions Rk. Also, a transparent electrode Tk formed of ITO (indium tin oxide) electrically connected to the metal electrodes Eka and Ekb is arranged between the metal electrodes Eka and Ekb. Here, the metal electrode on the center side of the aberration correction device 104 is identified by an appended letter "a," while the metal electrode on the outer side is identified by an appended letter "b." The gap Wk is sufficiently small as compared with the phase adjustment portions Rk, so that the spacing between an electrode E(k−1)b along the outer edge of a phase adjustment portion R(k−1) adjacent to the phase adjustment portion Rk and an electrode Ekb along the inner edge of the phase adjustment portion Rk is sufficiently small as compared with the width of the phase adjustment portion Rk. For example, they are arranged with a spacing of approximately several micrometers ($\mu$m). Also, the metal electrodes Eka and Ekb can be applied with voltages independently of each other.

The second electrode layer 118 is an entire surface electrode formed over the entire surface. In other words, the second electrode layer 118 need not be divided as long as the first electrode layer 117 is formed as a plurality of separate electrodes. Alternatively, the second electrode layer 118 may be formed in any shape necessary in accordance with the characteristic of aberration to be corrected, or formed as separated into any required plurality of separate electrodes.

In the following, the aberration correction operation performed by the aberration correction device 104 will be described in detail. The correction operation is performed under control of the controller 135, as described above.

Figure 19:
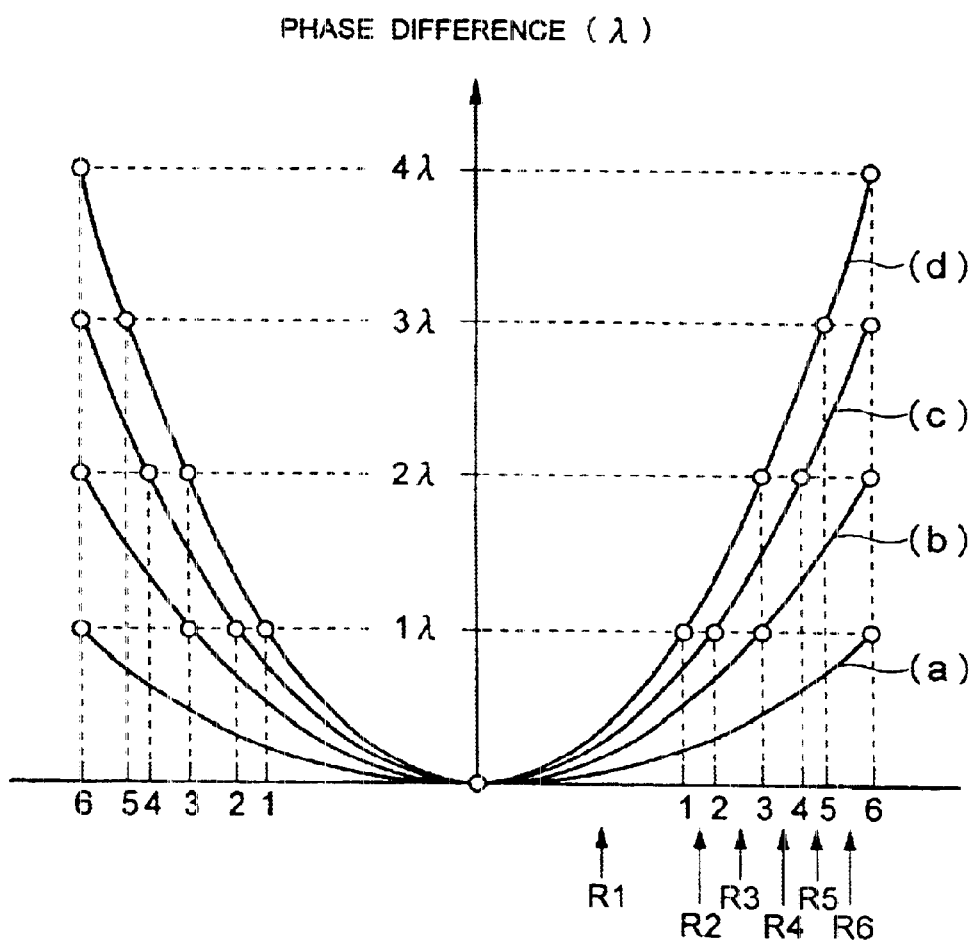
FIG. 19 is a diagram for explaining a method of dividing the first electrode layer into a plurality of phase adjustment portions, showing a phase difference ($\lambda$) from the center of the aberration correction device with respect to a radial position.

With referring to the drawings, a method of dividing the first electrode layer 117 into a plurality of phase adjustment portions will be described for the case where a maximum correctable phase difference is equal to 4$\lambda$ ($\lambda$ is the wavelength of a light beam). FIG. 19 shows a phase difference ($\lambda$) from the center of the aberration correction device 104 with respect to a radial position.

The position of a maximum phase difference (position 6 in FIG. 19) is determined when the maximum phase difference is equal to $\lambda$ (a curve (a) in FIG. 19) within the effective diameter of the aberration correction device 104. Then, the position at which the phase difference is equal to $\lambda$ (position 3) is determined when the maximum phase difference is equal to 2$\lambda$ (a curve (b)). Similarly, the position at which the phase difference is equal to an integer multiple of $\lambda$ is determined. Specifically, the positions at which the phase difference is equal to $\lambda$ and 2$\lambda$ (positions 2 and 4) are determined when the maximum phase difference is equal to 3$\lambda$ (a curve (c)), and the positions at which the phase difference is equal to $\lambda$, 2$\lambda$ and 3$\lambda$ (positions 1, 3 and 5) are determined when the maximum phase difference is equal to 4$\lambda$ (a curve (d)). Based on the positions 1–6 thus determined and the center (position 0) of the aberration correction device 104, a portion between positions 0–1 is defined as a phase adjustment portion R1, a portion between positions 1–2 is defined as a phase adjustment portion R2, and similarly, position adjustment portions R3, . . . , R6 are sequentially defined. Also, as described above, each phase adjustment portion is formed with the metal electrodes Eka, Ekb along edges on both sides of the phase adjustment portion, and a annular-shaped transparent electrode Tk between the electrodes.

Figure 20:
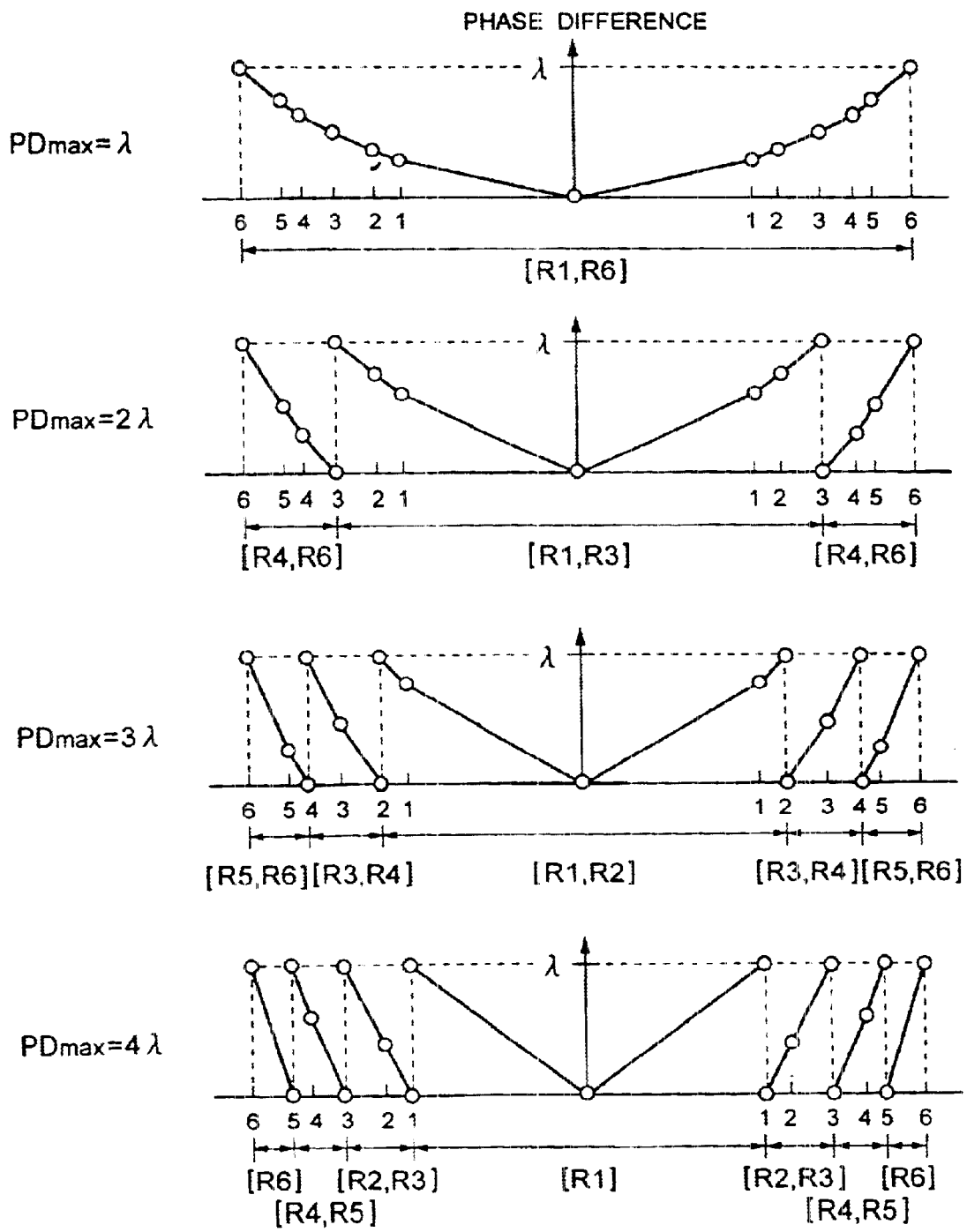
FIG. 20 are diagrams for explaining a method of driving the aberration correction device having phase adjustment portions R1–R6, showing that a maximum phase difference (PDmax) of a wavefront required for a correction is equal to $\lambda$, $2\lambda$, $3\lambda$, $4\lambda$, respectively.

Referring next to FIG. 20, a method of driving the aberration correction device 104 having the phase adjustment portions R1–R6 will be described. In the following description, a region comprised of consecutive phase adjustment portions Ri –Rj (j≧i) is denoted as a phase adjustment region [Ri, Rj]. When the maximum phase difference (PDmax) of a wavefront required for a correction is equal to $\lambda$, the electrodes Eka, Ekb (k=1–6) of each phase adjustment portion are applied with voltages such that a phase-adjustment amount in a phase adjustment region [Ri, R6] comprised of the entirety of the consecutive phase adjustment portions R1, . . . , R6 is equal to $\lambda$. More specifically, a driving voltage is applied such that the phase difference between the position of the electrode E6b on the outer edge of the phase adjustment portion R6 (i.e., position 6) and the center 0 is equal to $\lambda$. The remaining electrodes Eka, Ekb are applied with driving voltages to produce a phase difference distribution in which the phase difference in the radial direction is approximately proportional to a square of the radius. Since the transparent electrode Tk formed between the metal electrodes Eka, Ekb has a conductivity lower than that of the metal electrodes, an electric field applied to the liquid crystal 119 has a smooth cross-sectional distribution shape due to a voltage drop caused by the transparent electrode Tk.

When the maximum phase difference (PDmax) of the wavefront required for a correction is 2$\lambda$, two phase adjustment regions, each of which include one or more consecutive phase adjustment portions, for example, [R1, R3] and [R4, R6] are selected. Then, the electrodes Eka, Ekb of each phase adjustment portion within both the phase adjustment regions are applied with voltages such that the phase difference varies from zero to $\lambda$ in the phase adjustment region [R1, R3] comprised of the phase adjustment portions R1–R3, and the phase difference varies from zero to $\lambda$ in the phase adjustment region [R4, R6] comprised of the phase adjustment portions R4–R6. More specifically, each of the electrodes in the phase adjustment portions R1–R3 are applied with driving voltages such that the phase difference is equal to $\lambda$ at the position of the electrode E3b on the outer edge of the phase adjustment portion R3 (i.e., position 3). Also, each of the electrodes in the phase adjustment portions R4–R6 are applied with driving voltages such that the phase difference is equal to zero at the position of the electrode E4a on the inner side of the phase adjustment portion R4 (i.e., position 3), and the phase difference is equal to $\lambda$ at the position of the electrode E6b on the outer edge of the phase adjustment portion R6 (i.e., position 6).

Similarly, when the maximum phase difference (PDmax) of the wavefront required for a correction is equal to 3$\lambda$, each of the electrodes is applied with a driving voltage such that the phase difference varies from zero to $\lambda$ in each of the phase adjustment regions [R1, R2], [R3, R4], [R5, R6], i.e., such that the phase-adjustment amount is equal to $\lambda$ in each of the three phase adjustment regions. When the maximum phase difference (PDmax) of the wavefront required for a correction is equal to 4$\lambda$, each of the electrodes is applied with a driving voltage such that the phase difference varies from zero to X in each of the phase adjustment regions [R1], [R2, R3], [R4, R5], [R6], i.e., such that the phase-adjustment amount is equal to k in each of the four phase adjustment regions.

It is therefore possible to make stepwise correction or region-by-region correction of the spherical aberration by conducting the foregoing driving control. Specifically, the spherical aberration can be corrected in such a manner that phase adjustment regions including one or more consecutive phase adjustment portions are determined in accordance with the amount of produced spherical aberration so that the phase difference varies from zero to $\lambda$ in each of the phase adjustment regions.

While the foregoing embodiment has been described for an example in which the control is conducted such that the phase-adjustment amount in each of the phase adjustment regions is equal to a phase difference corresponding to the wavelength ($\lambda$) of the light beam, the present invention is not limited to the above-described control. Alternatively, the control may be conducted such that the phase difference varies by m$\lambda$ (m is an integer) from zero.

It is therefore possible to make stepwise correction or region-by-region correction even for large spherical aberration with a small number of electrodes by conducting the aforementioned control in accordance with the amount of produced spherical aberration.

Also, while the foregoing embodiment has been described for an example in which the electrodes are applied with driving voltages such that the phase difference is proportional to a square of the radius, the present invention can support a variety of shapes of aberration profiles by selecting applied voltages as appropriate in accordance with an aberration profile produced in an optical path.

Fifth Embodiment

FIGS. 21A, 21B are plan views schematically illustrating the structure of a first and a second electrode layer 117, 118 of an aberration correction device 104 according to a fifth embodiment of the present invention. As illustrated in FIG. 21A, the first electrode layer 117 has a plurality of phase adjustment portions in the shape of straight stripe parallel with one axis (assume the y-axis) within a plane perpendicular to the optical axis. Also, the plurality of phase adjustment portions are formed symmetrically about the y-axis. A circle indicated by a broken line represents an effective optical path diameter.

Figure 22:
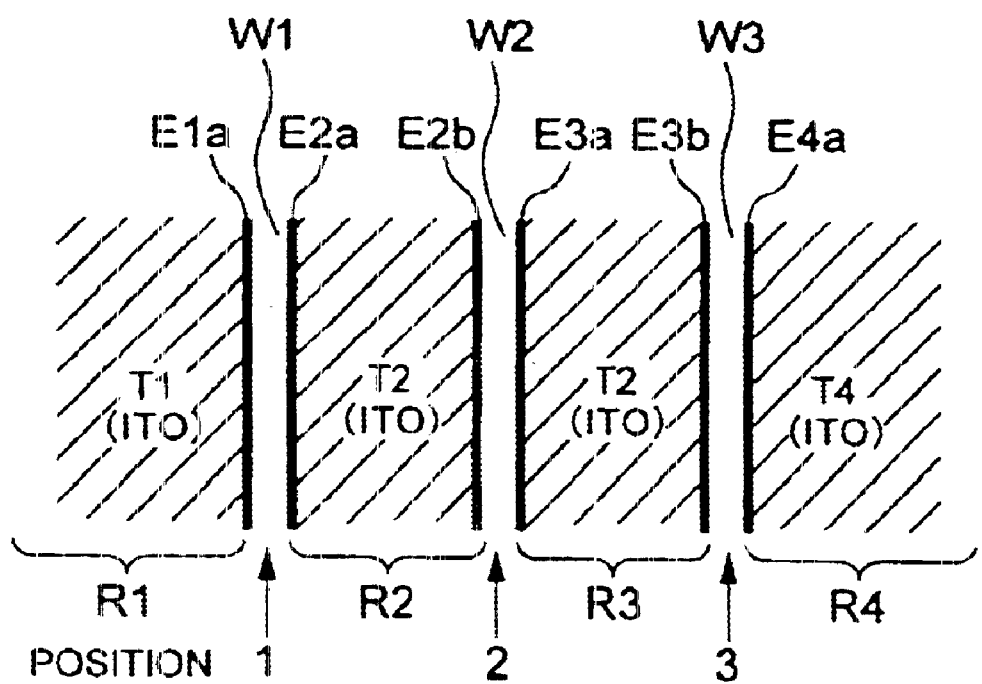
FIG. 22 is a partially enlarged view schematically illustrating a portion (a portion B) of the first electrode layer of the aberration correction device in the fifth embodiment of the present invention.

FIG. 22 is a partially enlarged view schematically illustrating a portion (portion B) of the first electrode layer 117. As is the case with the aforementioned fourth embodiment, a phase adjustment portion Rk has a pair of straight metal electrodes Eka and Ekb (k=1, 2, . . . ) arranged along edges on the center side (inner side) and outer side of the aberration correction device 104. The widths of the metal electrodes Eka and Ekb are sufficiently small as compared with the width of the phase adjustment portion Rk. Also, a transparent electrode Tk formed of an ITO film, electrically connected to the metal electrodes Eka and Ekb, is arranged between the metal electrodes Eka and Ekb. A gap Wk is sufficiently smaller than the width of the phase adjustment portion Rk, so that the spacing between an electrode $E_{(k-1)b}$ along the outer edge of the phase adjustment portion $R_{k-1}$ adjacent to the phase adjustment portion Rk and an electrode Ekb along the inner edge of the phase adjustment portion Rk is sufficiently small as compared with the width of the phase adjustment portion Rk. The metal electrodes Eka and Ekb can be applied with voltages independently of each other.

The second electrode layer 118 has a plurality of phase adjustment portions in the shape of straight stripes parallel with the direction perpendicular to the phase adjustment portions of the first electrode layer 117 (x-axis direction). Also, the plurality of phase adjustment portions are formed symmetrically about the y-axis. Each of the phase adjustment portions is formed with metal electrodes Eka and Ekb (k=1, 2, . . . ) and transparent electrodes Tk, similarly to the first electrode layer 117.

In the aberration correction device 104 configured as described above, for correcting spherical aberration produced in the optical path by applying the metal electrodes Eka and Ekb of the first electrode layer 117 and the second electrode layer 118 with voltages, a circular phase change (i.e., proportional to the radius r to the n-th power) may be produced in light passing through the liquid crystal 119.

In the following, the operation of the aberration correction device 104 of the embodiment will be described in brief. A phase change $\phi$ produced in light passing through the liquid crystal 119 is equivalently given as the sum of phase change components $\phi 1$ and $\phi 2$ due to the voltages applied to the respective electrode layers (i.e., $\phi=\phi 1+\phi 2$). In this event, since each phase adjustment portion is in the shape of straight stripe parallel with the x-axis or the y-axis, the phase change components $\phi 1$ and $\phi 2$ are functions of y and x, respectively. Therefore, as expressed by the following equation, the phase change components at a position (x, y) can be quadratic functions of y and x, respectively:

$$\phi 1 = W_2 y^2 \qquad (1)$$

$$\phi 2 = W_2 x^2 \qquad (2)$$

where $W_2$ is a predetermined secondary aberration coefficient, and the origin of the xy-plane is defined at the intersection of the optical axis of the optical path with a plane perpendicular to the optical axis.

Therefore, the phase change $\phi$ produced in light passing through the liquid crystal 19 is given as a quadratic function of the radius r in the following equation:

$$\phi = W_2 x^2 + W_2 y^2 = W_2 r^2 \qquad (3)$$

It is therefore possible to produce wavefront aberration which is proportional to a square of the radius using the aberration correction device 104 configured as described above. Thus, spherical aberration can be corrected by changing an incident angle of light flux impinging on an objective lens using this device. In addition, higher-order spherical aberration can be corrected by changing the shape of each phase adjustment portion.

Figure 23:
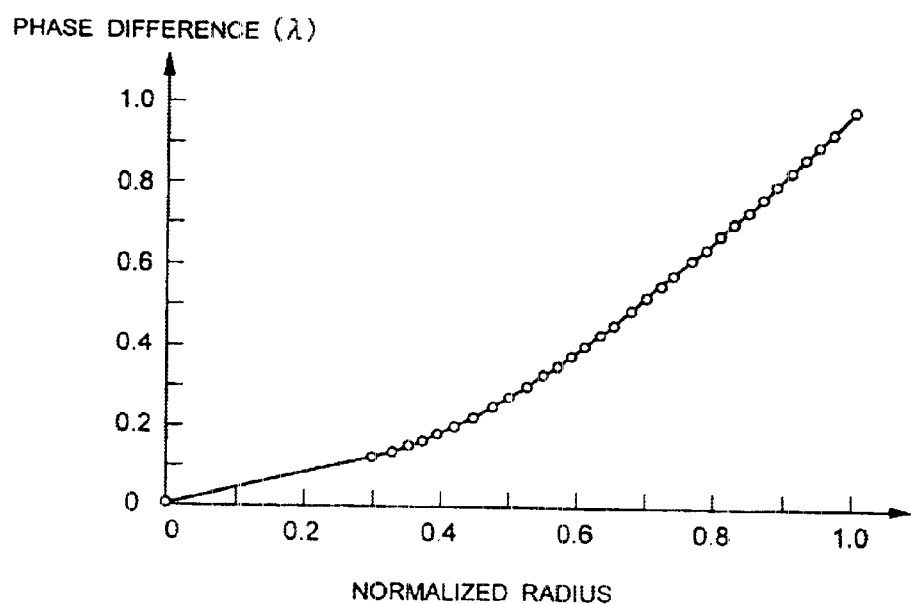
FIG. 23 is a diagram for explaining a method of driving the aberration correction device in the second embodiment of the present invention, showing that a maximum correction phase difference (PDmax) is equal to $\lambda$.
Figure 24A:
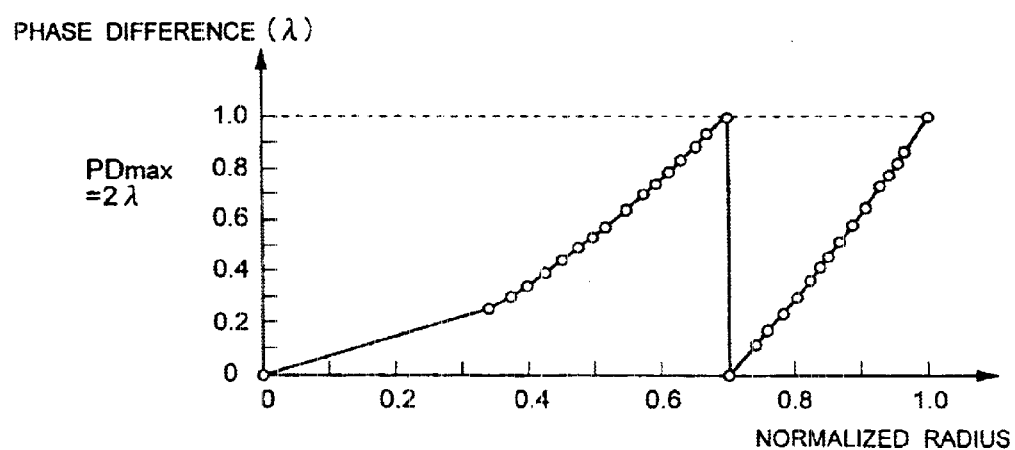
FIGS. 24A, 24B are diagrams for explaining a method of driving the aberration correction device in the fifth embodiment of the present invention, showing that the maximum correction phase difference (PDmax) is equal to $2\lambda$, $10\lambda$, respectively.
Figure 24B:
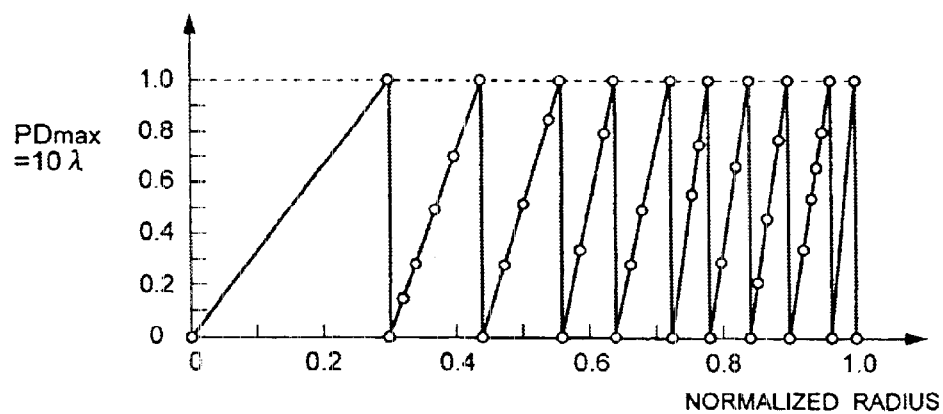

Then, a method of driving the aberration correction device 4 with the first and second electrode layers having phase adjustment portions Rk (k=1, 2, . . . , n) will be described with reference to the drawings. FIGS. 23, 24A, 24B show a phase difference produced by voltages applied to the phase adjustment portions with respect to a normalized radius. As shown in FIG. 23, when a maximum phase difference (PDmax) of a wavefront required for a correction is equal to $\lambda$, the electrodes Eka, Ekb (k=1–6) of each phase adjustment portion are applied with voltages such that the phase-adjustment amount by the phase adjustment region [R1, Rn] comprised of the phase adjustment portions R1–Rn is equal to $\lambda$. More specifically, driving voltages are applied such that a phase difference is equal to $\lambda$ at the position of an electrode Enb along the outer edge of the phase adjustment portion Rn. The remaining electrodes Eka, Ekb are applied with driving voltages to produce a phase difference distribution in which the phase difference in the radial direction is approximately proportional to a square of the radius.

As shown in FIG. 24A, when the maximum phase difference (PDmax) of the wavefront required for a correction is equal to $2\lambda$, the metal electrodes of each phase adjustment portion are applied with driving voltages such that the amounts of phase adjustment in two phase adjustment regions [R1, Rj], [R(j+1), Rn] are both equal to $\lambda$. Similarly, as shown in FIG. 24B, when the maximum phase difference (PDmax) of the wavefront required for a correction is equal to $10\lambda$, the driving voltages are applied such that the phase-adjustment amount in each of phase adjustment regions including one or more consecutive phase adjustment portions is equal to $\lambda$ or an integer multiple of $\lambda$, and the total amount of these phase adjustments is equal to the maximum phase difference (in this event, $10\lambda$). It is therefore possible to make stepwise correction or region-by-region correction of the spherical aberration such that the phase difference changes by $m\lambda$ (m is an integer) from zero in each of the phase adjustment regions including one or more consecutive phase adjustment portions in accordance with the amount of produced spherical aberration by executing the foregoing driving control.

Figure 25:
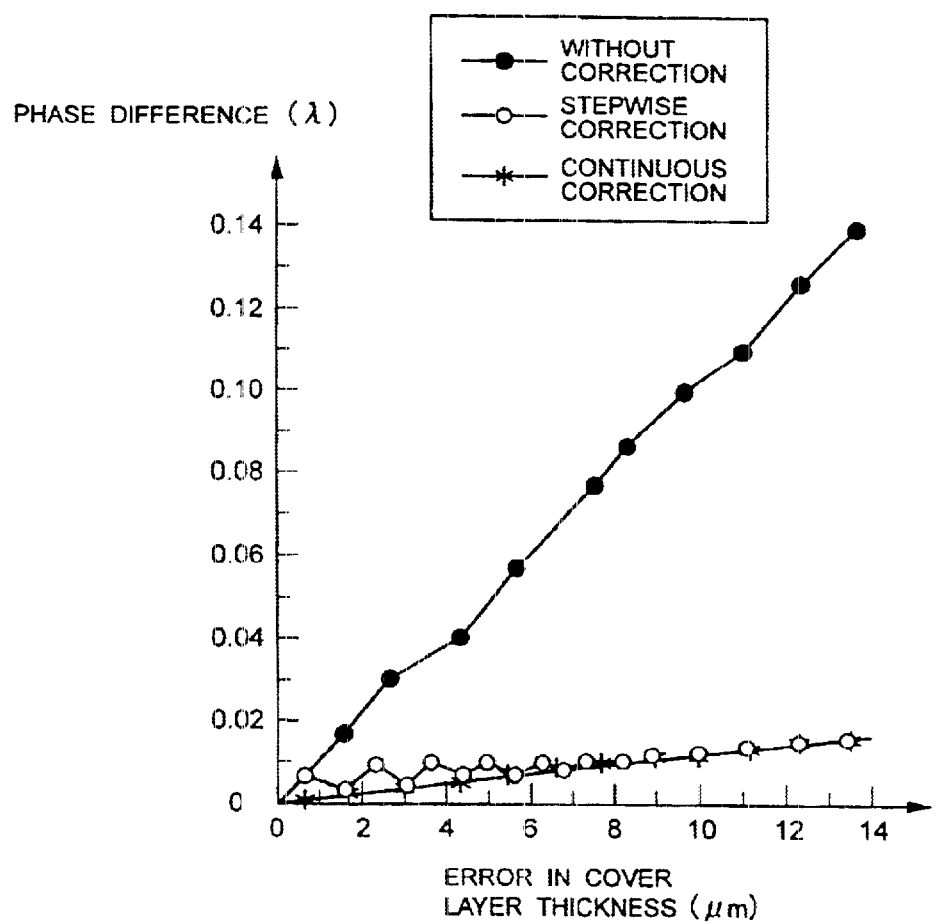
FIG. 25 is a graph showing the effect of aberration correction according to an embodiment of the present invention, showing a phase difference with respect to a change in thickness of a transparent cover layer.

FIG. 25 shows the effect of the aberration correction. Specifically, FIG. 25 shows a phase difference with respect to a change in the thickness of a transparent cover layer transmitted by a light beam irradiated to a recording layer of an optical disc when an objective lens with NA=0.85 is used. It can be seen that the aberration is effectively corrected even for a change in the thickness of the cover layer by making a stepwise correction according to the present invention. It can also be seen that the stepwise correction hardly differs in correction performance from a continuous correction.

With the aberration correction device 104 of the embodiment having the electrodes arranged in straight stripes, lead lines to the electrodes can be arranged out of the effective optical path diameter, so that they do not impede the aberration correction. Also, it is advantageous in that a fine correction can be made since a large number of phase adjustment portions can be provided.

While the foregoing embodiments have been described for an aberration correction apparatus which is applied to an optical pickup for an optical disc or the like, the present invention is not limited to the application to the optical pickup, but may be applied to apparatus for correcting aberration in a variety of optical systems. Also, numerical values and so on shown in the foregoing embodiments are merely illustrative. The foregoing embodiments can be modified as appropriate or applied in combination.

As will be apparent from the foregoing, the present invention can realize a compact and high performance aberration correction device and aberration correction apparatus which are capable of correcting aberration having a variety of shapes and capable of correcting large aberration as well.

Further embodiments of the present invention will be described in detail with reference to the drawings. In the drawings used in the following description, substantially equivalent components are designated the same reference numerals.

Sixth Embodiment

Figure 26:
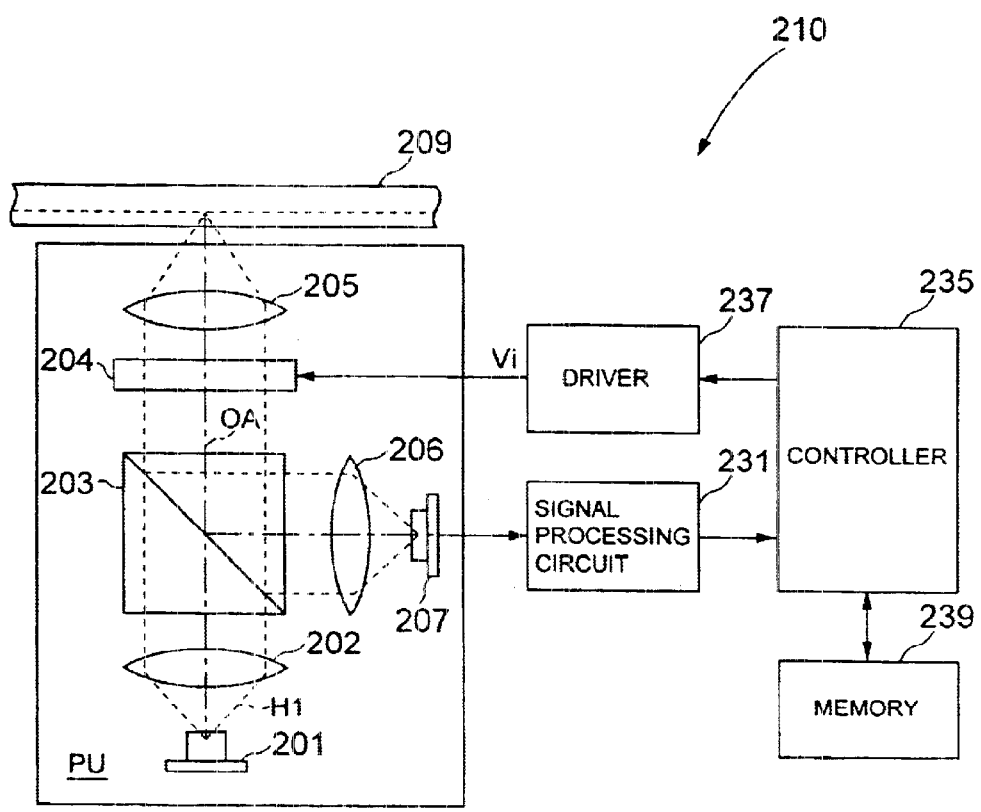
FIG. 26 is a block diagram illustrating the configuration of an aberration correction apparatus according to a sixth embodiment of the present invention.

FIG. 26 is a block diagram illustrating the configuration of an aberration correction apparatus 210 according to a sixth embodiment of the present invention. An optical pickup PU comprises a light source 201 for emitting laser light H1; a collimating lens 202; a beam splitter 203; an aberration correction device 204; an objective lens 205; a focusing lens 206, and an optical detector 207. These optical components 201–207 are positioned along an optical axis OA.

The laser light source 201 in the optical pickup emits laser light, for example, at wavelength $\lambda$ equal to 405 nanometer (nm). The light beam H1 emitted from the laser light source 201 is reflected off an optical disc 209, and reflected light is detected by the optical detector 207. The detected RF signal is sent to a signal processing circuit 231. The signal processing circuit 231 generates a signal required for controlling the aberration correction device 204 from the received RF signal, and sends the signal to a controller 235. For example, the signal processing circuit 231 detects the envelope of the RF signal which is sent to the controller 235 as an RF amplitude signal. The controller 235 determines the amount of aberration of a light beam in a plane of the aberration correction device, i.e., an aberration distribution (profile) based on the RF amplitude signal received from the signal processing circuit 231 and/or in accordance with a predetermined processing procedure. Further, the controller 235 determines a driving amount for each of phase adjustment portions of the aberration correction device, later described, based on the aberration distribution. The controller 235 supplies a control signal indicating the driving amount to a liquid crystal driver circuit 237 for driving the aberration correction device 204. The driver circuit 237 generates a driving voltage to be applied to the aberration correction device 204 in response to the control signal, and supplies the driving voltage to the aberration correction device 204. Also, the controller 235 is connected to a storage device (memory) 239 for storing data, commands and so on for use in a variety of controls.

The aberration correction device 204 has an optoelectric element which produces an opto-electric effect by an electric field. More specifically, the aberration correction device 204 has a liquid crystal optical device which produces a change in birefringence in accordance with the magnitude of a driving voltage Vi applied thereto. More specifically, as schematically illustrated in a perspective view of FIG. 27, the aberration correction device 204 has a structure in which a liquid crystal 219 is sandwiched and encapsulated between a first electrode layer 217 and a second electrode layer 218. On the liquid crystal 219, liquid crystal orienting films 221, 222 are formed, while transparent insulating layers 223, 224 are formed between the liquid crystal orienting films 221, 222 and the first and second electrode layers 217, 218, respectively. Also, on the first and second electrode layers 217, 218, insulating substrates 215, 216 such as transparent glass substrates are formed, respectively.

Figure 27:
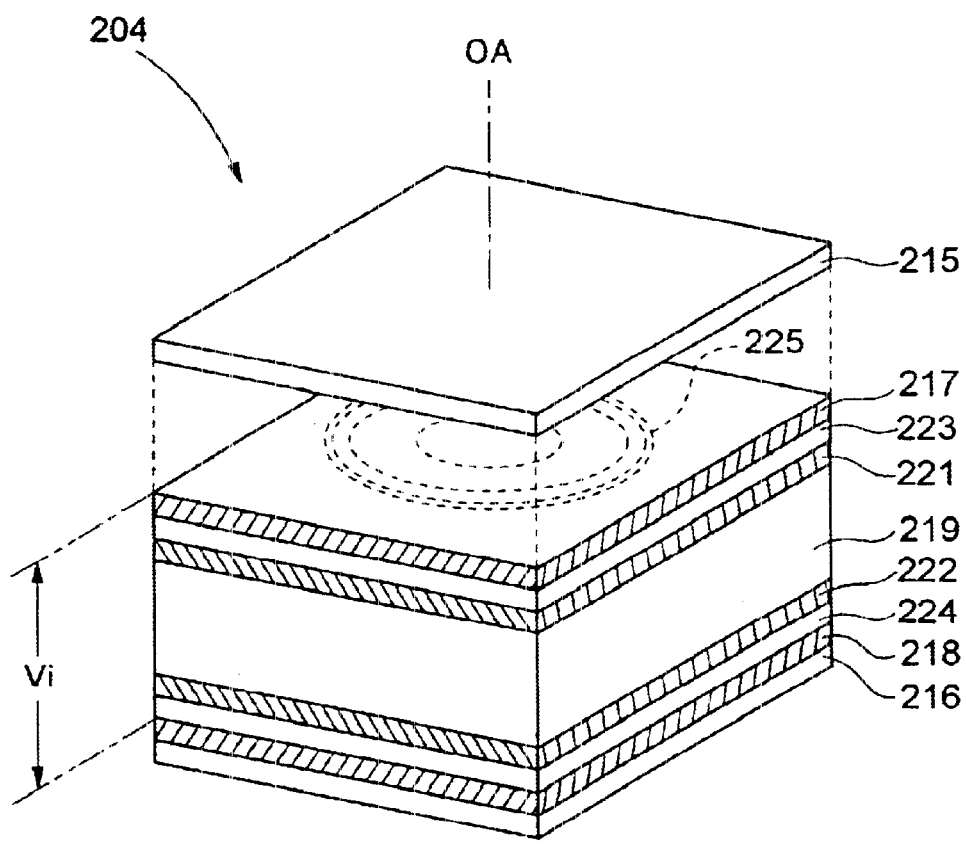
FIG. 27 is a perspective view schematically illustrating the configuration of an aberration correction device.

As will be described later in detail, at least one of the first and second electrode layers 217, 218 has a plurality of phase adjustment portions. Aberration of a light beam can be corrected by applying an electrode formed in each phase adjustment portion with a voltage according to the shape of a distribution of the aberration of the light beam which transmits the aberration correction device 204. The following description will be made on an example in which the first electrode layer 217 has a plurality of phase adjustment portions. Also, FIG. 27 illustrates an example in which a plurality of concentric phase adjustment portions 225 are formed. Specifically, as a control voltage Vi (i=1, 2, . . . ) is applied to an electrode in each phase adjustment portion of the first electrode layer 217, the orientation of liquid crystal molecules in the liquid crystal 219 changes in accordance with an electric field produced by the control voltage Vi. As a result, light passing through the liquid crystal 219 undergoes birefringence of the liquid crystal 219, so that its phase changes. In other words, the polarization state (phase) can be controlled by the control voltage Vi applied to the liquid crystal 219.

Figure 28:
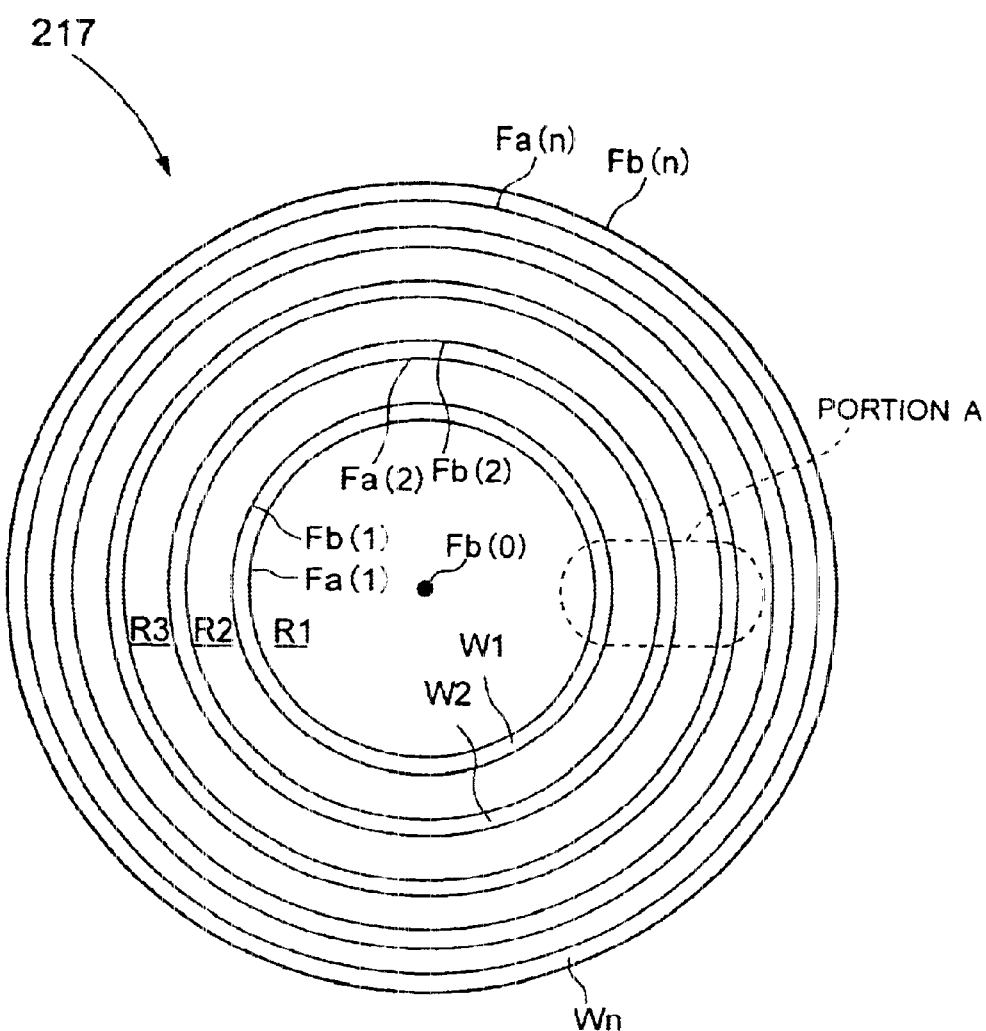
FIG. 28 is a plan view schematically illustrating the structure of a first electrode layer of the aberration correction device for correcting spherical aberration.
Figure 29:
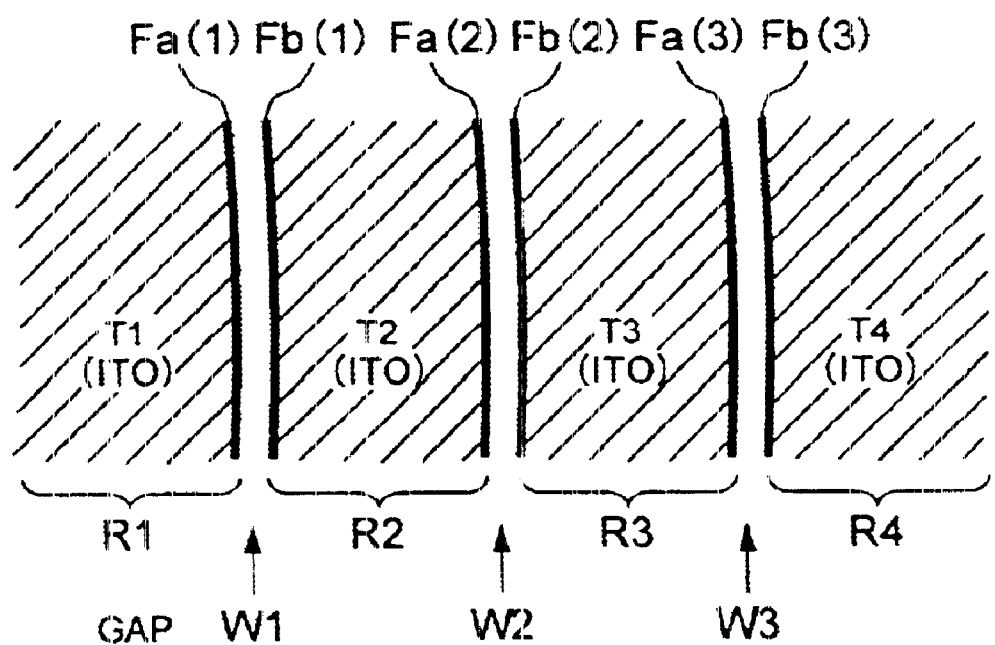
FIG. 29 is a partially enlarged view schematically illustrating a portion (a portion A) of the first electrode layer of the aberration correction device illustrated in FIG. 28.

The structure of the first electrode layer in the aberration correction device 204 for correcting spherical aberration is schematically illustrated in a plan view of FIG. 28. The first electrode layer 217 comprises a plurality of concentric (circular) phase adjustment portions Rk (k=1, 2, . . . ) defined by gaps Wk (k=1, 2, . . . ) in correspondence to a distribution of spherical aberration produced by the optical disc 209. FIG. 29 is a partially enlarged view schematically illustrating a portion (a portion A) of the first electrode layer 217.

As illustrated in FIG. 29, each phase adjustment portion Ri is isolated by the gap Wi (i=1, 2, . . . ). The phase adjustment portion Ri has a pair of circular metal electrodes Fb(i–1) and Fa(i) arranged along edges on the center side (inner side) and the outer side of the aberration correction device 204. In other words, the metal electrodes Fa(i) and Fb(i) are formed on both sides of the gap Wi, respectively. Here, the metal electrode on the center side of the aberration correction device 204 is identified by an appended letter "a," while the metal electrode on the outer side by an appended letter "b."

The metal electrodes Fa(i) and Fb(i) (i=1, 2, . . . ) have small widths as compared with the width of the phase adjustment portion Ri. Also, a transparent electrode Ti (i=1, 2, . . . ) formed of ITO (indium tin oxide) electrically connected to the metal electrodes Fa(i) and Fb(i) is arranged between the metal electrodes Fa(i) and Fb(i). The width of the gap Wi is sufficiently small as compared with the phase adjustment portions Ri, so that the spacing between the electrodes Fa(i) and Fb(i) is sufficiently small as compared with the width of the phase adjustment portion Ri. For example, they are arranged with a spacing of approximately several micrometers ($\mu$m). Also, the metal electrodes Fa(i) and Fb(i) can be applied with voltages independently of each other.

The second electrode layer 218 is an entire surface electrode, i.e., a single electrode formed over the entire surface. In other words, the second electrode layer 218 need not be divided as long as the first electrode layer 217 is formed as a plurality of separate electrodes. Alternatively, the second electrode layer 218 may be formed in any shape necessary in accordance with the characteristic of aberration to be corrected, or formed as separated into a plurality of separate electrodes.

Figure 30:
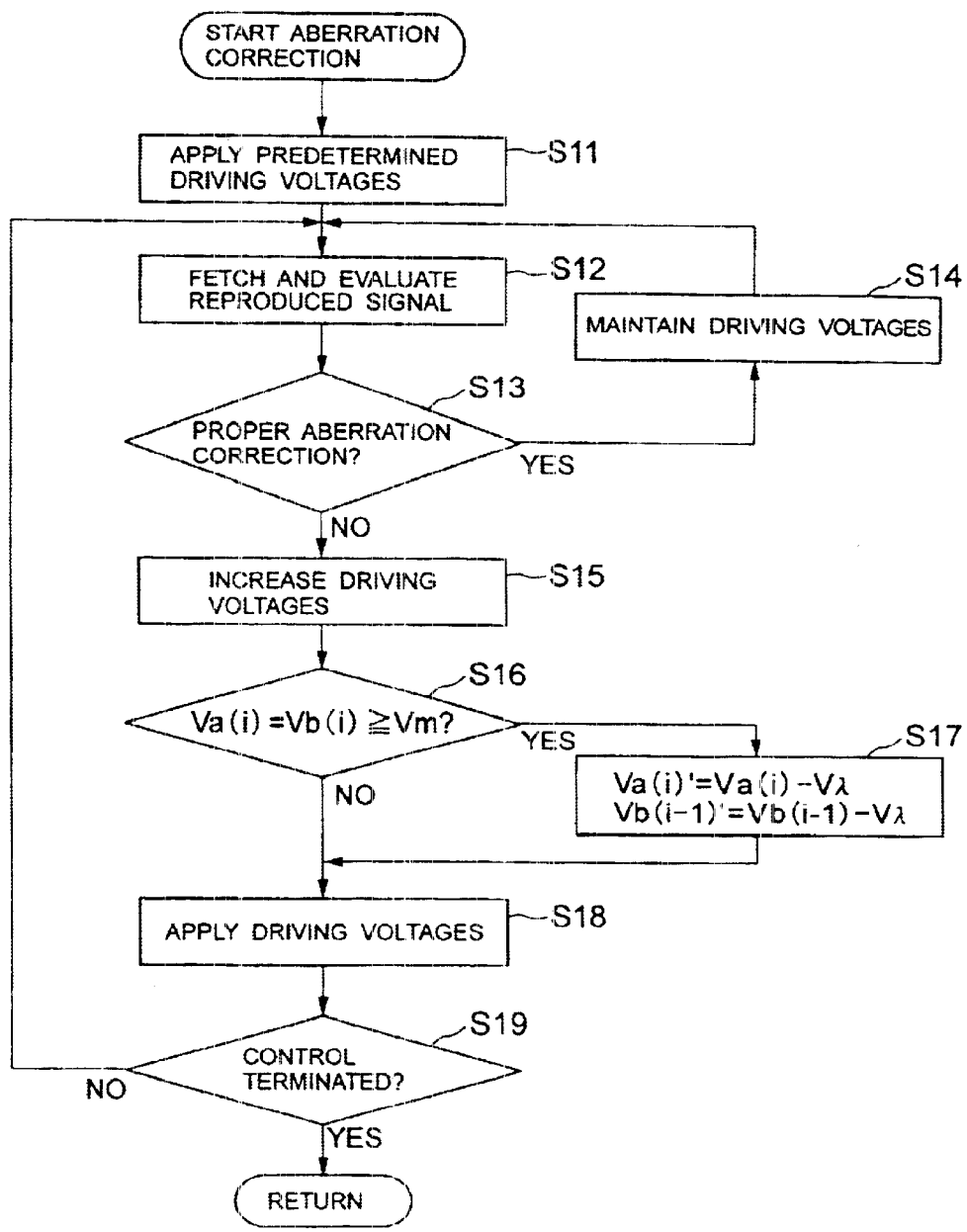
FIG. 30 is a flow chart illustrating a procedure of an aberration correction operation performed by the aberration correction device illustrated in FIG. 28.

A procedure of the aberration correction operation performed by the aberration correction device 204 will be described in detail with reference to FIG. 30. The following description will be made on an example in which the aberration correction device 204 is comprised of six phase adjustment portions Ri (i.e., R1–R6) when spherical aberration produced by an optical disc 209 is corrected. The aberration correction operation is performed under control of the controller 235.

The controller 235 applies the driver circuit 237 with a predetermined control signal at the start of the aberration correction operation. The driver circuit 237 supplies the aberration correction device 204 with driving voltages which should be applied to the respective phase adjustment portions of the aberration correction device 204 in response to the control signal (step S11).

Subsequently, the controller 235 fetches an RF reproduced signal from the signal processing circuit 231, and evaluates the reproduced signal using evaluation values, for example, a jitter amount, a signal amplitude, and so on (step S12). The controller 235 determines whether or not aberration is properly corrected by a phase adjustment (step S13). The determination can be made, for example, by checking whether the above evaluation values satisfy predetermined criteria, or whether or not they have been improved from the past evaluation values. Upon determining that the aberration is properly corrected, the controller 235 conducts the control to maintain the current control state, i.e., the driving voltages to the aberration correction device 204 (step S14).

Figure 31:
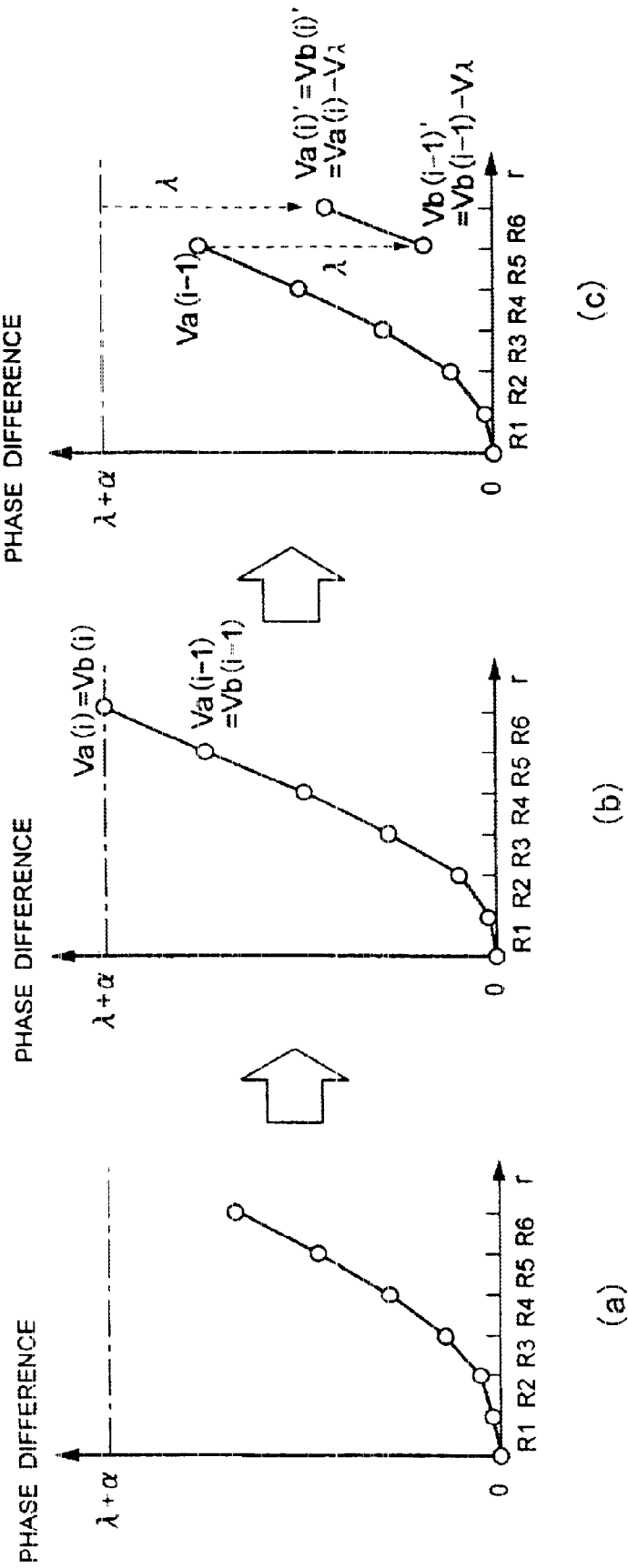
FIG. 31 is a diagram showing a phase difference provided to a light beam by each phase adjustment portion with respect to a radial direction of the aberration correction device.
Figure 32:
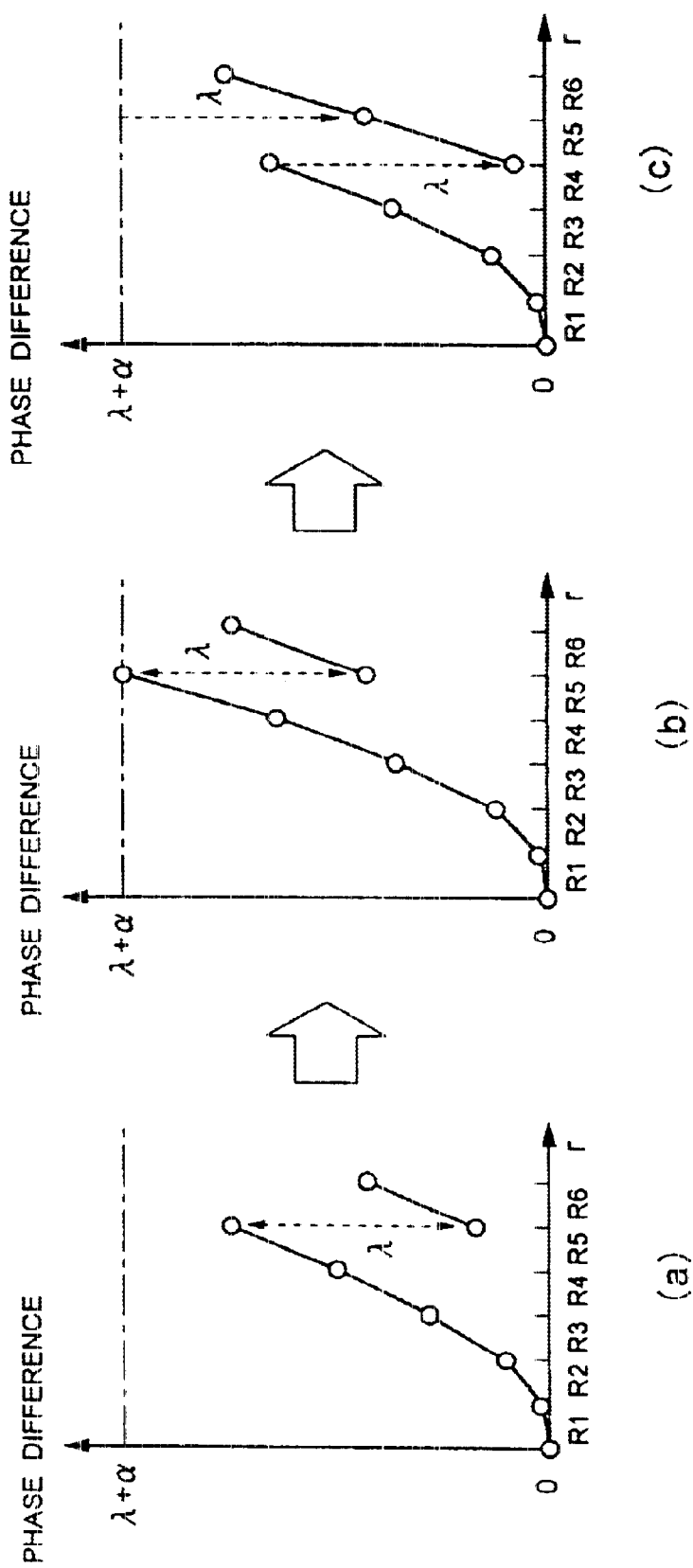
FIG. 32 is a diagram showing an aberration correction operation when a phase-adjustment amount is increased for correcting large aberration.
Figure 33:
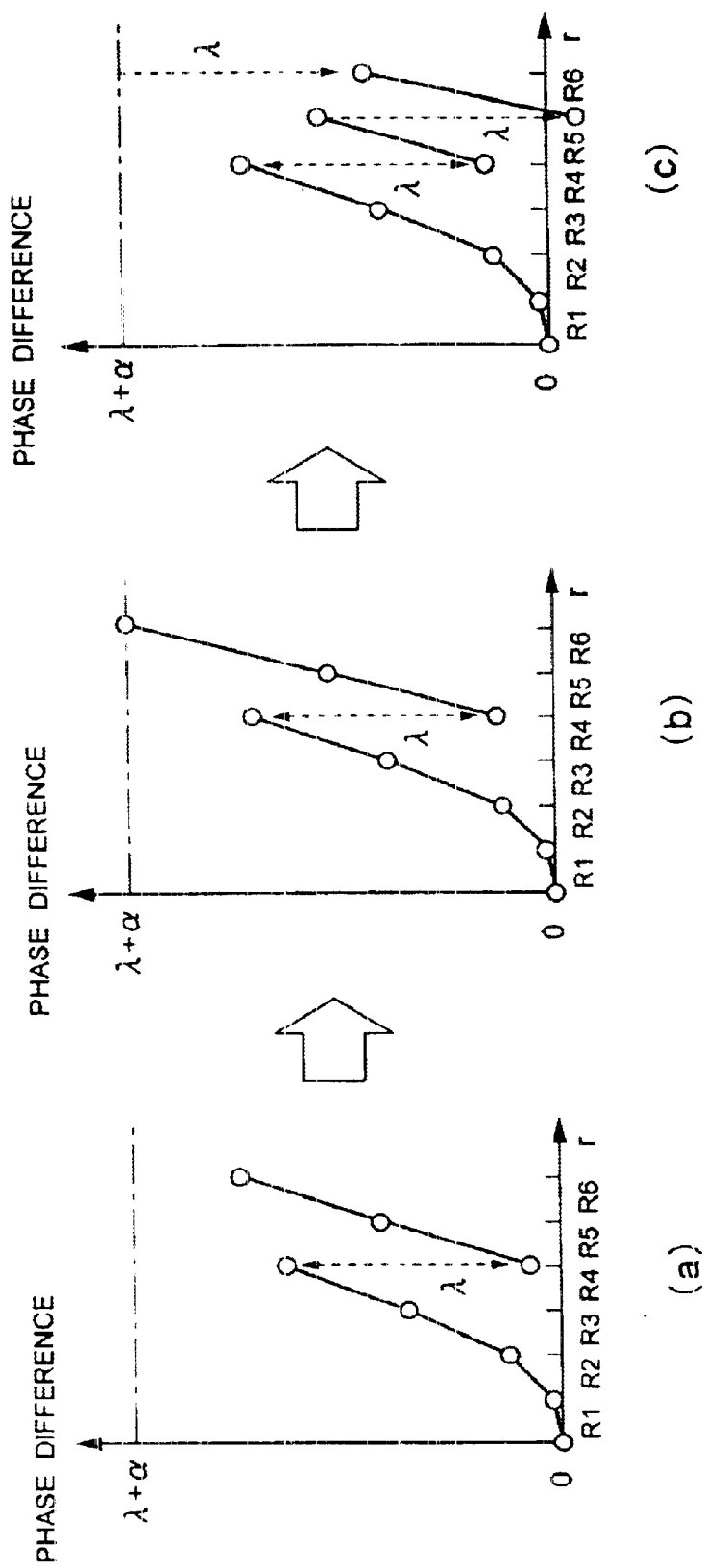
FIG. 33 is a diagram showing an aberration correction operation when the phase-adjustment amount is increased further than the case shown in FIG. 32.

The controller 235 conducts the control to change the driving voltages when it is determined at step S13 that the aberration correction is not proper (step S15). In the following, the control for changing the driving voltages will be described in detail with reference to the drawings. FIGS. 31 through 33 show a phase difference given to a light beam in a radial direction of the aberration correction device 204. As shown in (a) of FIG. 31, a phase adjustment is made by applying voltages to the respective phase adjustment portions Ri (i=1–6). Specifically, a phase difference is given to the light beam for each phase adjustment portion Ri with respect to the phase at a predetermined reference position, i.e., the center position of the aberration correction device 204 to perform the phase adjustment. Therefore, the phase difference has a positive or a negative value with respect to the phase of the light beam at the predetermined reference position depending on aberration produced in the light beam. As described later, the phase adjustment is made for each phase adjustment portion Ri based on an absolute value of a phase difference (hereinafter, simply referred to the "phase-adjustment amount") given to each phase adjustment portion Ri for the phase adjustment.

The controller 235 increases the driving voltages to the respective phase adjustment portions Ri (i=1–6) to increase the phase-adjustment amounts when the aberration correction is not sufficient in the state shown in (a) of FIG. 31. In this event, the controller 235 increases the driving voltages based on a predetermined control rule, for example, an applied voltage allocation ratio or the like, stored in the memory 239.

Then, the controller 235 determines whether or not the phase-adjustment amount in any phase adjustment portion Ri exceeds a predetermined limit adjustment amount $\lambda$m. The limit adjustment amount $\lambda$m is determined based on the thickness of the liquid crystal 219 of the aberration correction device 204 and a range of aberration amount to be corrected. In the following, description will proceed with $\lambda m = \lambda + \alpha (\alpha > 0)$. The determination is made based on whether or not a voltage applied to a phase adjustment portion exceeds a limit voltage Vm corresponding to the limit adjustment amount $\lambda$m. More specifically, the controller 235 determines whether or not a voltage Va(i) (=Vb(i)) applied to the electrode Fa(i) of each phase adjustment portion Ri exceeds the limit voltage Vm (step S16).

For example, as shown in (b) of FIG. 31, if one of applied voltages Va(i) (i.e., Va(6) in (b) of FIG. 31) is determined to exceed the voltage Vm, the controller 235 calculates a voltage resulting from a subtraction of a voltage V$\lambda$ corresponding to a phase amount of one wavelength from the voltage Va(i) at the electrode on the radially outer side of the phase adjustment portion Ri (R6 in the case shown in FIG. 31). Specifically, the controller 235 calculates a voltage to be applied to the electrode Va(i)'=Va(i)–V$\lambda$. Similarly, the controller 235 calculates a voltage resulting from a subtraction of the voltage V$\lambda$ corresponding to the phase amount of one wavelength from the voltage Vb(i–1) at the electrode on the radially inner side of the phase adjustment portion R6. Specifically, the controller 235 calculates Va(i)'=Va(i)−Vλ, Vb(i−1)'=Vb(i−1)−Vλ (step S17). The controller 235 supplies the driver circuit 237 with a control signal indicating the calculated voltage to apply the respective electrodes of the aberration correction device 204 with driving voltages in accordance with the control signal (step S18). Therefore, the phase amount corresponding to one wavelength is subtracted from the phase-adjustment amount of the phase adjustment portion Ri (R6 in FIG. 31). Then, the controller 235 determines whether or not the aberration correction control is terminated (step S19). When the control is terminated, the control exits this process routine to return to a main routine.

When the controller 235 determines at step S19 that the aberration correction control is not terminated, the controller 235 proceeds to step S12 to repeat the procedure at step S12 onward.

FIGS. 32 and FIGS. 33 show that the foregoing procedure is repeated to correct a further larger aberration. A graph (b) of FIG. 32 shows that the phase-adjustment amount is further increased from the case of (a) of FIG. 32. As the phase-adjustment amount of the phase adjustment portion R(i−1) (=R5) reaches a predetermined limit adjustment amount λm, the phase amount corresponding to one wavelength is subtracted from the phase-adjustment amount of the phase adjustment portion R5 ((c) of FIG. 32).

When the phase-adjustment amount is further increased, as the phase adjustment portion R6, from which the phase amount corresponding to one wavelength has already been subtracted from the phase-adjustment amount thereof, and again reaches the predetermined limit adjustment amount λm as shown in (b) of FIG. 33, the phase amount corresponding to one wavelength is again subtracted from the phase-adjustment amount of the phase adjustment portion R6.

As described above, a compact and high performance aberration correction apparatus capable of correcting aberration having a variety of shapes as well as capable of correcting large aberration can be realized by driving the respective phase adjustment portions in accordance with the shape of aberration distribution and repeating the aforementioned procedure to change voltages applied to the respective phase adjustment portions.

Seventh Embodiment

Figure 34:
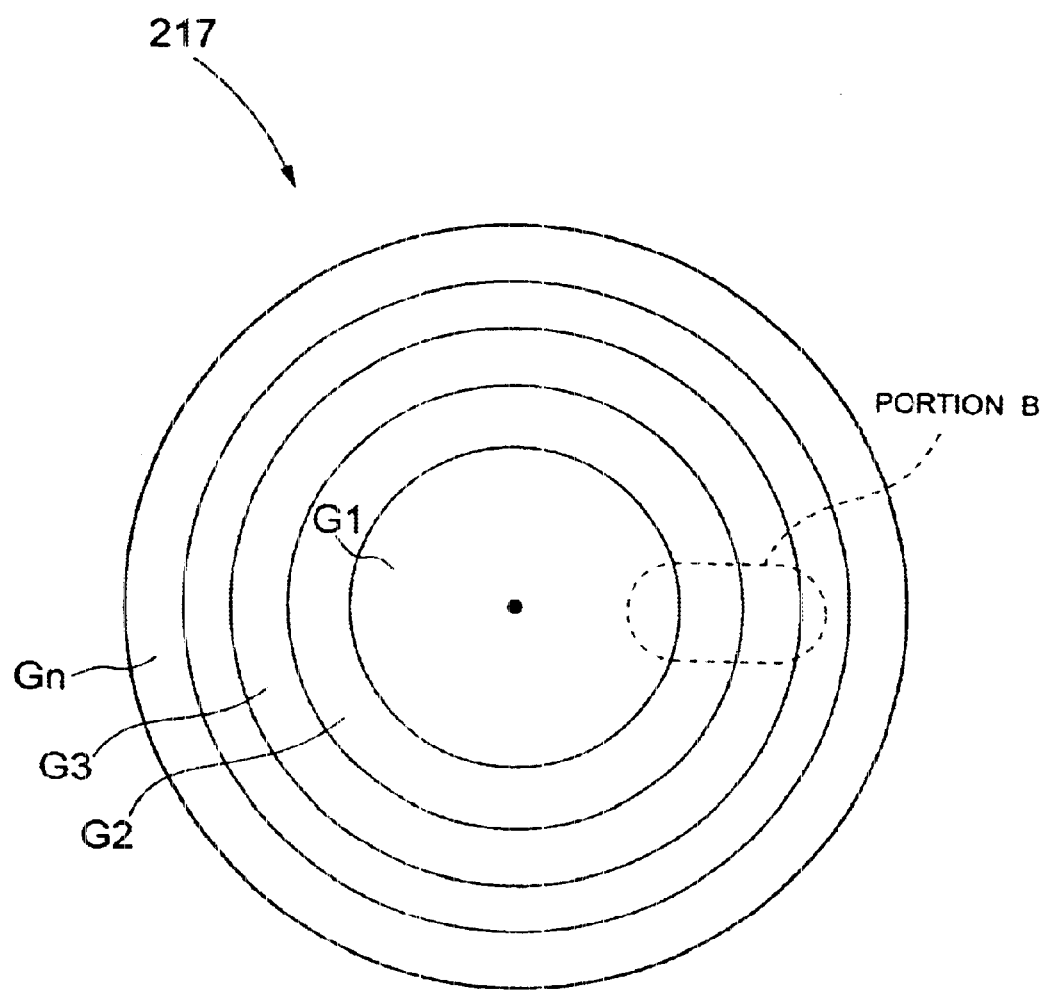
FIG. 34 is a diagram schematically illustrating the structure of a first electrode layer of an aberration correction device according to a seventh embodiment of the present invention.
Figure 35:
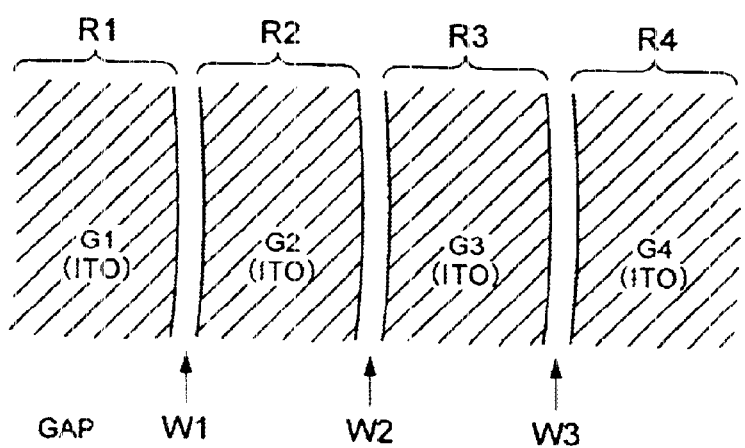
FIG. 35 is a partially enlarged view schematically illustrating a portion (a portion B) of the first electrode layer of the aberration correction device illustrated in FIG. 34.

FIG. 34 is a diagram schematically illustrating the structure of a first electrode layer 217 of an aberration correction device 204 according to a seventh embodiment of the present invention. The first electrode layer 217 is comprised of a plurality of concentric (circular) phase adjustment portions Ri (i=1, 2, . . . ) defined by gasp Wi (i=1, 2, . . . ) in correspondence to a distribution of spherical aberration produced by an optical disc 209. FIG. 35 is a partially enlarged view schematically illustrating a portion (a portion B) of the first electrode layer 217.

As illustrated in FIG. 35, the respective phase adjustment portions Ri are isolated by the gaps Wi (i=1, 2, . . . ). More specifically, each phase adjustment portion Ri is comprised of an electrically isolated circular transparent electrode Gi (i=1, 2, . . . ) formed of an ITO (indium tin oxide) film. The phase-adjustment amounts of the respective phase adjustment portions Ri can be varied by independently applying the transparent electrodes Gi with voltages.

A second electrode layer 218 is an entire surface electrode, i.e., a single transparent electrode formed over the entire surface. The second electrode layer 218 need not be divided as long as the first electrode layer 217 is formed as a plurality of separate electrodes, and may be formed in any shape necessary. For example, the second electrode layer 218 may be comprised of a plurality of circular transparent electrodes, similar to the first electrode layer 217.

Figure 36:
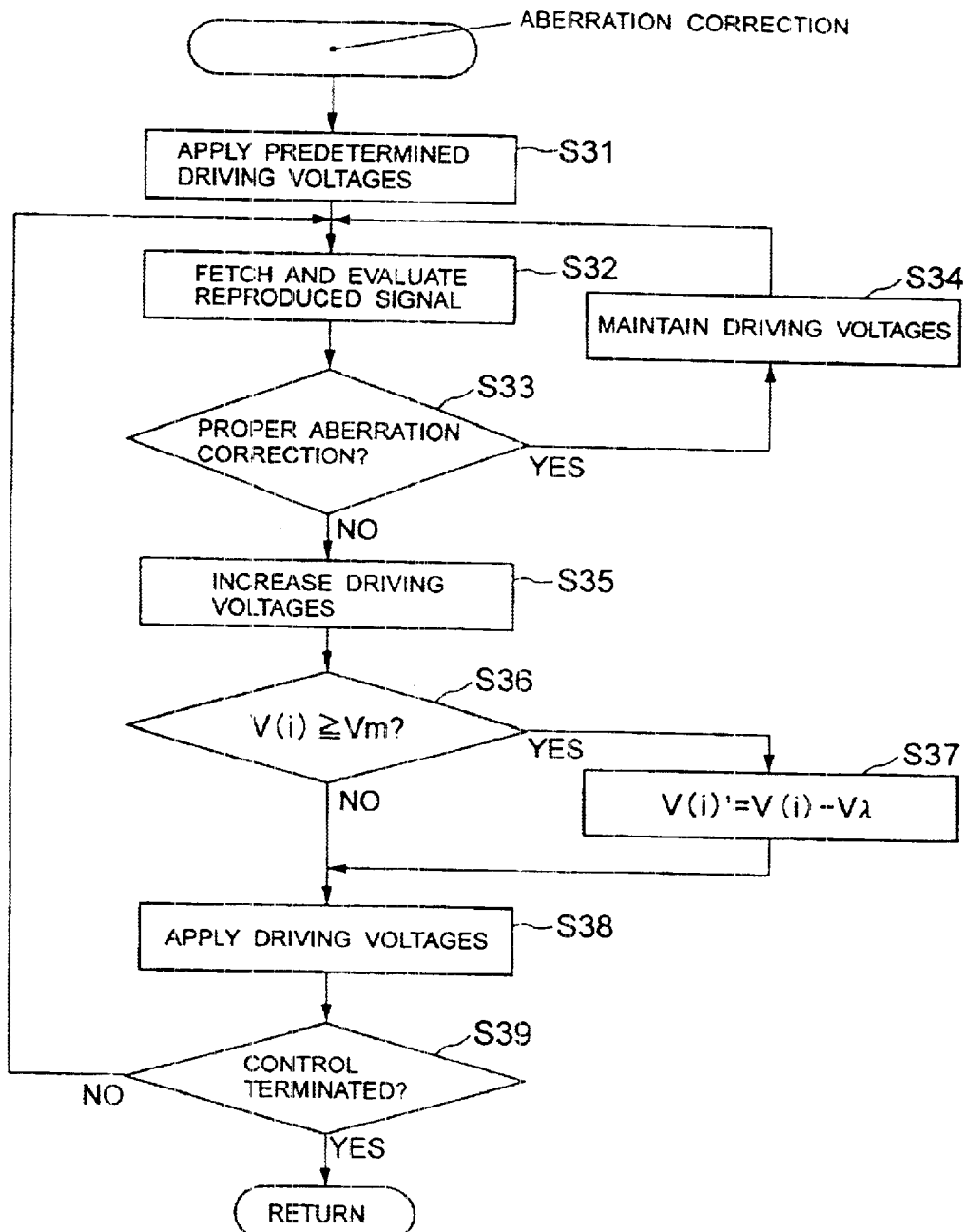
FIG. 36 is a flow chart illustrating a procedure of an aberration correction operation performed by the aberration correction device illustrated in FIG. 34.

In the following, the aberration correction operation performed by the aberration correction device 204 will be described in detail with reference to a flow chart illustrated in FIG. 36. The aberration correction operation is performed under control of the controller 235. Like the above-described embodiment, the following description will be made on an example in which the aberration correction device 204 is comprised of six phase adjustment portions Ri (i.e., R1–6) when spherical aberration is corrected.

The controller 235 applies the driver circuit 237 with a predetermined control signal at the start of the aberration correction operation. The driver circuit 237 supplies the aberration correction device 204 with driving voltages which should be applied to the respective phase adjustment portions of the aberration correction device 204 in response to the control signal (step S31).

Subsequently, the controller 235 receives an RF reproduced signal from the signal processing circuit 231, and evaluates the reproduced signal using evaluation values, for example, a jitter amount, a signal amplitude, and so on (step S32). As a result of the evaluation, the controller 235 determines based on predetermined criteria whether or not aberration is properly corrected by a phase adjustment (step S33). Upon determining that the aberration is properly corrected, the controller 235 conducts the control to maintain the current control state, i.e., the driving voltages to the aberration correction device 204 (step S34).

Figure 37:
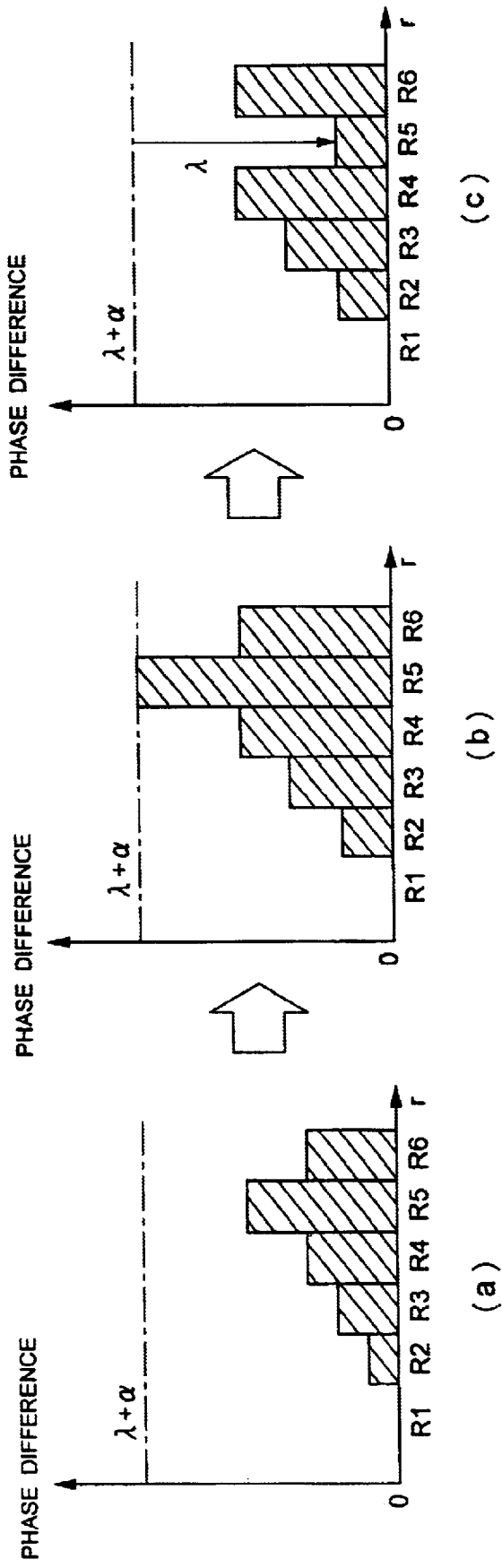
FIG. 37 is a diagram showing a phase difference provided to a light beam by each phase adjustment portion with respect to a radial direction of the aberration correction device.

The controller 235 conducts the control to change the driving voltages (step S35) when it is determined at step S33 that the aberration correction is not proper. In the following, the control for changing the driving voltages will be described in detail with reference to the drawings. FIGS. 37 and 38 show a phase difference (>0), i.e., a phase adjustment amount given to a light beam in a radial direction of the aberration correction device 204.

For example, as shown in (a) of FIG. 37, a phase adjustment is made by applying voltages to the respective phase adjustment portions Ri (i=1–6). If an aberration correction is not sufficient in this state, the controller 235 increases the driving voltages to the respective phase adjustment portions Ri (i=1–6) to increase the phase-adjustment amounts. In this event, the controller 235 increases the driving voltages based on a predetermined control rule, for example, an applied voltage allocation ratio or the like, stored in the memory 239.

Then, the controller 235 determines whether or not the phase-adjustment amount in any phase adjustment portion Ri reaches or exceeds a predetermined limit adjustment amount λm (step S36). This determination is made based on whether or not a voltage applied to a phase adjustment portion is exceeding a limit voltage Vm corresponding to the limit adjustment amount λm. For example, as shown in (b) of FIG. 37, if the controller 235 determines that one of applied voltages V(i) to the respective phase adjustment portion Ri (V(5) in (b) of FIG. 37) exceeds the voltage Vm and the phase-adjustment amount of the phase adjustment portion R5 exceeds the limit adjustment amount λm=λ+α (α>0), the controller 235 calculates a voltage resulting from a subtraction of a voltage Vλ corresponding to a phase amount of one wavelength from the voltage V(i) (=V(5)). Specifically, the controller 235 calculates a voltage to be applied to the electrode V(i)'=V(i)−Vλ (step S37).

Then, the controller 235 supplies the driver circuit 237 with a control signal indicating the calculated voltage to apply the respective electrodes of the aberration correction device 204 with driving voltages in accordance with the control signal (step S38). Therefore, the phase amount corresponding to one wavelength is subtracted from the phase-adjustment amount of the phase adjustment portion R5 as shown in (c) of FIG. 37. Then, the controller 235 determines whether or not the aberration correction control is terminated (step S39). When the control is terminated, the control exits this routine to return to the main routine.

If the controller 235 determines at step S39 that the aberration correction control is not terminated, the controller 235 proceeds to step S32 to repeat the procedure at step S32 onward.

FIG. 38 shows that the foregoing procedure is repeated to correct further larger aberration. A graph (a) of FIG. 38 shows that the phase-adjustment amount is further increased from the case in (a) of FIG. 37. As the phase-adjustment amounts of the phase adjustment portions R4 and R6 are determined to reach a predetermined limit adjustment amount $\lambda m$, the phase amount corresponding to one wavelength is subtracted from the phase-adjustment amounts of the phase adjustment portions R4 and R6 ((b) of FIG. 38) based on the procedure described above.

Figure 39:
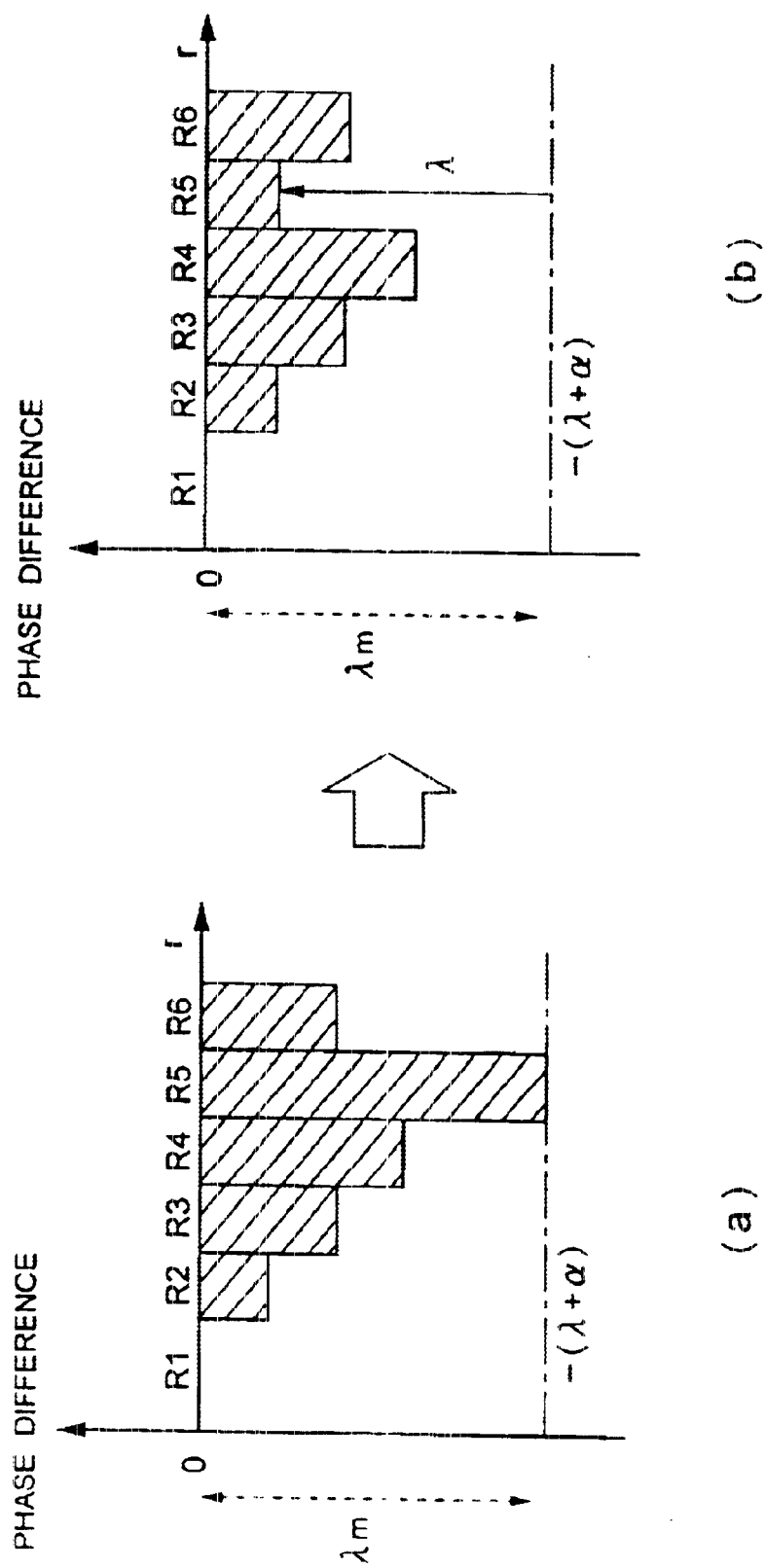
FIG. 39 is a diagram illustrating an aberration correction when a phase difference is negative.

While the foregoing embodiments have been described for the case where the phase difference is positive, aberration can be corrected as well by a similar procedure when the phase difference is negative. More specifically, as shown in (a) of FIG. 39, the phase amount corresponding to one wavelength may be subtracted from the phase-adjustment amount of a phase adjustment portion (R5 in the case shown in the figure) which exceeds the limit adjustment amount $\lambda m=|-\lambda-\alpha|$. In addition, the phase amount subtracted from the phase-adjustment amount is not limited to that corresponding to one wavelength, but may be an integer multiple of one wavelength.

As described above, it is possible to realize a compact and high performance aberration correction apparatus which can correct aberration having a variety of shapes as well as correct large aberration by driving the respective phase adjustment portions in accordance with the shape of distribution of aberration, and repeating the aforementioned procedure to change voltages applied to the respective phase adjustment portions.

While the foregoing description has been made on the aberration correction apparatus applied to an optical pickup for an optical disc or the like, the present invention is not limited to the application to the optical pickup, but may be applied to apparatus for correcting aberration in a variety of optical systems. Also, numerical values and so on shown in the foregoing embodiments are merely illustrative. The foregoing embodiments can be modified as appropriate or applied in combination.

As will be apparent from the foregoing, the present invention can realize a compact and high performance aberration correction device and aberration correction apparatus which are capable of correcting aberration having a variety of shapes and capable of correcting large aberration as well.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Applications No. 2000-198163, No. 2000-342014 and No. 2000-380242 which are hereby incorporated by reference.

What is claimed is:

1. An aberration correction unit disposed in an optical path of an optical system for irradiating a recording medium with a light beam for correcting aberration produced in said light beam, said aberration correction unit comprising:
   a first electrode and a second electrode being opposed to each other; and
   a liquid crystal, disposed between said first electrode and said second electrode, for producing a holographic diffraction grating effect by applying a voltage across the liquid crystal to produce a change in phase to light passing therethrough,
   wherein at least one of said first electrode and said second electrode is formed in a partitioned shape such that said liquid crystal produces a holographic diffraction grating effect because of the partitioned shape when applying voltages to said first electrode and said second electrode.

2. An aberration correction unit according to claim 1, wherein the shape of said first electrode and said second electrode is determined so that concentric field blades are generated in said liquid crystal by application thereto of predetermined voltages.

3. An aberration correction unit according to claim 2, wherein each of the field blades produced in said liquid crystal by applying the predetermined voltages to said first electrode and said second electrode produces a change in phase corresponding to an integer multiple of the wavelength of a light beam passing through said liquid crystal.

4. An aberration correction unit according to claim 1, wherein said first electrode and said second electrode are shaped such that spherical aberration produced in said optical path is corrected by applying the predetermined voltages to said first electrode and said second electrode.

5. An aberration correction unit according to claim 1, wherein at least one of said first electrode and said second electrode has a transparent conductive layer and a plurality of divided electrodes formed on said transparent conductive layer.

6. An aberration correction unit according to claim 1, wherein at least one of said first electrode and said second electrode has a plurality of divided electrodes, said plurality of divided electrodes including predetermined divided electrodes which are electrically connected.

7. An aberration correction unit according to claim 5, wherein said plurality of divided electrodes are metal electrodes.

8. An optical pickup device having an aberration correction unit according to any one of claims 1 to 7, comprising:
   a light source for emitting said light beam;
   an optical system for guiding said light beam; and
   an optical detector for detecting a light beam which has been reflected by said recording medium and transmitted said aberration correction unit.

9. An aberration correction apparatus having the optical pickup device according to claim 8, comprising:
   voltage applying means for applying voltages to said first electrode and said second electrode of said aberration correction unit so that said liquid crystal produces a holographic diffraction grating effect.

10. An aberration correction device for correcting aberration produced in a light beam of an optical system for guiding said light beam, comprising:

a first electrode layer and a second electrode layer being opposed to each other; and a liquid crystal disposed between said first electrode layer and said second electrode layer for producing a change in phase in a light beam passing therethrough in accordance with voltages applied to said first electrode layer and said second electrode layer, wherein said first electrode layer is divided into a plurality of phase adjustment portions which are electrically isolated from each other, each of said plurality of phase adjustment portions including a pair of electrodes arranged in a form that produces an electric field distribution for correcting said aberration by applying predetermined voltages thereto.

11. An aberration correction device according to claim 10, wherein said plurality of phase adjustment portions are arranged to produce a phase difference corresponding to an integer multiple of the wavelength of said light beam in a phase adjustment region by applying a predetermined voltage to said phase adjustment region, said phase adjustment region including one or more consecutive phase adjustment portions.

12. An aberration correction device according to claim 10, wherein said first electrode layer has a plurality of concentrically formed phase adjustment portions.

13. An aberration correction device according to claim 10, wherein said first electrode layer has a plurality of phase adjustment portions arranged in a shape of stripes, and said second electrode layer has a plurality of phase adjustment portions in a shape of stripes substantially perpendicular to said phase adjustment portions of said first electrode layers.

14. An aberration correction device according to claim 10, wherein said pair of electrodes are metal electrodes, and said aberration correction device further includes a transparent conductive material disposed between said pair of electrodes, said conductive material having a smaller conductivity than said pair of electrodes and being electrically connected to said pair of electrodes.

15. An aberration correction apparatus having an aberration correction device according to claim 10, comprising:

a determination section for determining each aberration amount of said light beam in a region corresponding to each of said plurality of phase adjustment portions;

a voltage applying section for applying each of said plurality of phase adjustment portions with voltages corresponding to each of the determined aberration amounts;

a selecting section for selecting a phase adjustment region including one or more consecutive phase adjustment portions based on each of the determined aberration amounts; and a controller for conducting a control for changing a phase-adjustment amount in said phase adjustment region to a phase amount corresponding to an integer multiple of the wavelength of said light beam.

16. An aberration correction apparatus for correcting aberration produced in a light beam of an optical system for guiding said light beam, comprising:

an aberration correction device having a plurality of phase adjustment portions for producing a phase change in said light beam by an voltage applied thereto;

a phase adjustment section for applying voltage to each of said plurality of phase adjustment portions to adjust the phase;

a determination section for determining whether a phase-adjustment amount of each said phase adjustment portion exceeds a predetermined limit adjustment amount; and a controller for changing the phase-adjustment amount of each said phase adjustment portion to a value resulting from a subtraction of a phase amount corresponding to an integer multiple of the wavelength of said light beam from the phase-adjustment amount on the basis of the result of determination made by said determination section.

17. An aberration correction apparatus according to claim 16, wherein the phase-adjustment amount after the change does not exceed a phase amount corresponding to one wavelength of said light beam.

18. An aberration correction apparatus according to claim 16, wherein said plurality of phase adjustment portions are concentrically formed.

19. An aberration correction apparatus according to claim 16, wherein said phase-adjustment amount is larger than a phase amount corresponding to one wavelength of said light beam.

20. A method of correcting aberration for an aberration correction device having a plurality of phase adjustment portions for producing a phase change in a light passing through said aberration correction device to adjust the phase, comprising the steps of:

applying a voltage to each of said plurality of phase adjustment portions to adjust the phase;

determining whether a phase-adjustment amount of said phase adjustment portion exceeds a limit adjustment amount; and changing the phase-adjustment amount of each said phase adjustment portion to a value resulting from a subtraction of a phase amount corresponding to an integer multiple of the wavelength of said light beam from the phase-adjustment amount on the basis of the result of the determination in the determining step.

* * * * *